US008520230B2

(12) United States Patent  
Kato et al.

(10) Patent No.: US 8,520,230 B2
(45) Date of Patent: Aug. 27, 2013

(54) IMAGE PROCESSING SYSTEM, IMAGE PROCESSING APPARATUS, IMAGE FORMING APPARATUS, IMAGE PROCESSING METHOD, PROGRAM, AND RECORDING MEDIUM WITH LOGIN MANAGEMENT AND AUTHENTICATION TICKETS

(75) Inventors: Ai Kato, Kanagawa (JP); Kazunori Takatsu, Kanagawa (JP); Tatsuya Shirai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 569 days.

(21) Appl. No.: 12/836,072

(22) Filed: Jul. 14, 2010

(65) Prior Publication Data

US 2011/0026064 A1 Feb. 3, 2011

(30) Foreign Application Priority Data

Jul. 31, 2009 (JP) ................................. 2009-179897
Mar. 26, 2010 (JP) ................................. 2010-072837

(51) Int. Cl.
*G06F 15/00* (2006.01)
*G06K 1/00* (2006.01)
*G06K 15/00* (2006.01)
*G06F 3/12* (2006.01)

(52) U.S. Cl.
USPC ........................................ 358/1.14; 358/1.15

(58) Field of Classification Search
None
See application file for complete search history.

(56) References Cited

U.S. PATENT DOCUMENTS

| 7,280,237 | B2 * | 10/2007 | Komiya ........................ 358/1.13 |
| 8,228,537 | B2 * | 7/2012 | Uehara ........................ 358/1.15 |
| 2003/0020760 | A1 | 1/2003 | Takatsu et al. |
| 2005/0267890 | A1 | 12/2005 | Itoh et al. |
| 2006/0069676 | A1 | 3/2006 | Takatsu et al. |
| 2006/0187240 | A1 | 8/2006 | Araki et al. |
| 2006/0253416 | A1 | 11/2006 | Takatsu et al. |
| 2007/0011316 | A1 | 1/2007 | Araki et al. |

FOREIGN PATENT DOCUMENTS

| JP | 2002-252732 | 9/2002 |
| JP | 2006-18640 | 1/2006 |
| JP | 2006-134301 | 5/2006 |
| JP | 2009-69992 | 4/2009 |
| JP | 2010-68374 | 3/2010 |

OTHER PUBLICATIONS

U.S. Appl. No. 08/539,334, filed Oct. 4, 1995, Takashi Saitoh, et al.

* cited by examiner

*Primary Examiner* — Douglas Tran
(74) *Attorney, Agent, or Firm* — Oblon, Spivak, McClelland, Maier & Neustadt, L.L.P.

(57) ABSTRACT

Disclosed is an image processing system including a user management unit that manages login and issues an authentication ticket to an image forming apparatus; a task request unit that makes an image processing request with an addition of the authentication ticket; a detection unit that detects whether the image processing request is authorized; a task processing unit that makes the image processing request with an addition of user information accompanied by identification information; a task management unit that stores a task in a task queue and receives an inquiry about the task; one or more image processing units that acquire the processible image processing request to perform the image processing; a storage unit that stores image data processed by the one or more image processing units; and an acquisition unit that specifies a location where the processed image data are stored and acquires the image data.

9 Claims, 23 Drawing Sheets

FIG.8

ORGANIZATION TABLE

| ORG_ID | NAME | ADDRESS |
|---|---|---|
| 3 | BB | OTA-KU ··· |

USER TABLE

| USER_ID | ORG_ID | LOGIN_NAME | PASSWORD |
|---|---|---|---|
| 15 | 3 | CCC | PASSWORD |

LICENSE TABLE

| LICENSE_ID | USER_ID | SERVICE_ID | STATE |
|---|---|---|---|
| 1 | 15 | 1 | AVAILABLE |

SERVICE TABLE

| SERVICE_ID | NAME |
|---|---|
| 1 | SIMPLE_OCR_JAPANESE_V1 |

SESSION TABLE

| SESSION_ID | USER_ID |
|---|---|
| abcdefgh | 15 |

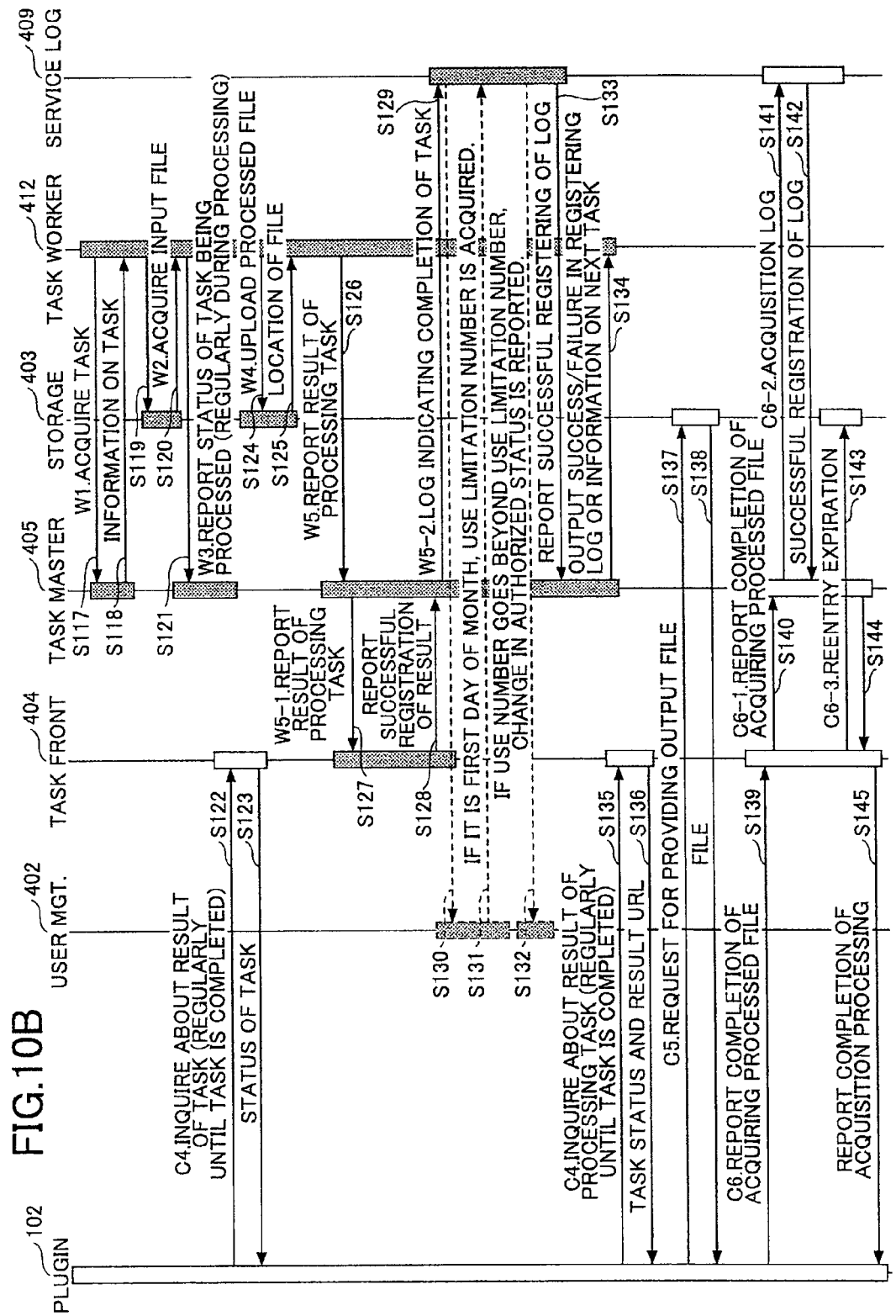

FIG.11A

REQUEST

| POST {service host}/user_management/tickets |
|---|

PARAMETER

| PARAMETER | REQUIRED | MEANING | EXAMPLE |
|---|---|---|---|
| ORGANIZATION | REQUIRED | CONTRACTUAL ACCOUNT (ORGANIZATION NAME) | BB |
| UID | REQUIRED | API KEY (LOGIN NAME) | CCC |
| PASSWORD | REQUIRED | PASSWORD | ZZZ |

FIG.11B

RESPONSE

XML ELEMENT OF BODY AT THE TIME OF SUCCESS

| ELEMENT | APPEARANCE NUMBER | MEANING |
|---|---|---|
| service_tkt | 1 | VALUE OF COOKIE |

EXAMPLE

| <service_tkt>MTRmOTFiOD ··· Y2OGFjMWFhNmM%3D</service_tkt> |
|---|

FIG.12A

REQUEST

| POST [service host]/tasks_front/v1/files.xml |
|---|

PARAMETER

| PARAMETER | REQUIRED | MEANING | EXAMPLE |
|---|---|---|---|
| file[n] | REQUIRED | PLURAL FILE CONTENTS HAVING VARIABLE n (n = 0, 1,···file_number−1) | |
| file_number | REQUIRED | THE NUMBER OF FILES TO BE TRANSMITTED | |
| tracking_id | OPTIONAL | INFORMATION SPECIFYING JOB OF CLIENT | |

FIG.12B

RESPONSE

XML ELEMENT OF BODY AT THE TIME OF SUCCESS

| ELEMENT | APPEARANCE NUMBER | MEANING |
|---|---|---|
| files | 1 | TOP NODE |
| files/location | 0−n | LOCATION OF UPLOADED FILE |

EXAMPLE

```
<files>
  <location>https://XXX.compute-1.AAA.com/storage/BB/4/entries/file/62</location>
  <location>https://XXX.compute-1.AAA.com/storage/BB/4/entries/file/63</location>
</files>
```

FIG.13A

REQUEST

| POST {service host}/tasks_front/v1/tasks.xml |

PARAMETER

| PARAMETER | REQUIRED | MEANING | EXAMPLE |
|---|---|---|---|
| file | OMISSION IS NOT PERMITTED IF NO input_file_locations EXISTS | FILE CONTENT | |
| input_file_locations | OMISSION IS NOT PERMITTED IF NO file EXISTS | LOCATION OF UPLOADED FILE. PERFORM LINE FEEDING TO SEPARATE SECTIONS IF MANY LOCATIONS EXIST. | |
| task_type | REQUIRED | NAME OF OCR (IMAGE PROCESSING) SERVICE | Simple_OCR_Japanese_v1 Simple_OCR_Global_v1 |
| option | SET ACCORDING TO ENGINE | SETTING VALUES OF SPECIFIED OCR SERVICE | format:spdf\nlang:Eng |
| tracking_id | FOR LOGGING, OPTIONAL | INFORMATION FOR SPECIFYING JOB OF CLIENT | |
| device | FOR LOGGING, OPTIONAL | INFORMATION FOR SPECIFYING MFP SUCH AS MODEL ID | |
| user | FOR LOGGING, OPTIONAL | USER LOGGING INTO MFP | |
| application_name | FOR LOGGING, OPTIONAL | NAME + VERSION OF APPLICATION OF CLIENT | |
| tracking_info | FOR LOGGING, OPTIONAL | TEXT IN WHICH OTHER DATA FOR LOGGING ARE STRUCTURED | |

FIG.13B

RESPONSE

XML ELEMENT OF BODY AT THE TIME OF SUCCESS

| ELEMENT | APPEARANCE NUMBER | MEANING |
|---|---|---|
| task | 1 | TOP NODE |
| task/location | 1 | LOCATION OF REGISTERED TASK |
| task/status | 1 | STATUS OF PROCESSING TASK |
| task/task-type | 1 | SERVICE NAME OF TASK PROCESSING |
| task/created-at | 1 | TASK REGISTRATION TIME |
| task/error | 0 OR 1 | ERROR TYPE |
| task/massage | 0 OR 1 | ERROR MESSAGE |

EXAMPLE

```
<task>
 <location>https://XXX.compute-1.AAA/tasks_front/tasks/:id.xml</location>
 <status>accepted</status>
 <option>format:word¥nlang:Jpn</option>
 <task-type>Simple_OCR_Japanese_v1</task-type>
 <created-at type="datetime">2009-04-21T06:24:44Z</created-at>
</task>
```

FIG.14A

REQUEST

GET {service host}/tasks_front/tasks/v1/:id.xml

FIG.14B

RESPONSE

XML ELEMENT OF BODY AT THE TIME OF SUCCESS

| ELEMENT | APPEARANCE NUMBER | MEANING |
|---|---|---|
| task | 1 | TOP NODE |
| task/location | 1 | LOCATION OF REGISTERED TASK |
| task/status | 1 | STATUS OF PROCESSING TASK (accepted: TASK BEING PROCESSED, finished: TASK SUCCESSFULLY COMPLETED, error: PROCESSING ERROR) |
| task/output-file-location | 0 OR 1 | LOCATION OF OUTPUT FILE |
| task/task-type | 1 | SERVICE NAME OF TASK PROCESSING |
| task/created-at | 1 | TASK REGISTRATION TIME |
| task/updated-at | 1 | TASK INFORMATION UPDATE TIME |
| task/message | 0 OR 1 | ERROR MESSAGE |

EXAMPLE

・TASK BEING PROCESSED

```
<task>
 <location>https://XXX.compute-1.AAA.com/tasks_front/tasks/:id.xml</location>
 <status>accepted</status>
 <output-file-location></output-file-location>
 <task-type>Simple_OCR_Japanese_v1</task-type>
 <created-at type="datetime">2009-04-21T06:24:44Z</created-at>
 <updated-at type="datetime">2009-04-21T06:24:52Z</updated-at>
</task>
```

・TASK SUCCESSFULLY COMPLETED

```
<task>
 <location>https://XXX.compute-1.AAA.com/tasks_front/tasks/:id.xml</location>
 <status>finished</status>
 <output-file-location>https://XXX.compute-1.AAA.com/storage/BB/4/entries/file/62
 </output-file-location>
 <task-type>Simple_OCR_Japanese_v1</task-type>
 <created-at type="datetime">2009-04-21T06:24:44Z</created-at>
 <updated-at type="datetime">2009-04-21T06:24:52Z</updated-at>
</task>
```

・TASK FAILURE

```
<task>
 <location>https://XXX.compute-1.AAA.com/tasks_front/tasks/:id.xml</location>
 <status>error</status>
 <massage>XXXXXX</massage>
 <task-type>Simple_OCR_Japanese_v1</task-type>
 <created-at type="datetime">2009-04-21T06:24:44Z</created-at>
 <updated-at type="datetime">2009-04-21T06:24:52Z</updated-at>
</task>
```

FIG.15

REQUEST

GET :output-file-location(URL SPECIFIED BY TASK INFORAMTION)

FIG.16A

REQUEST

PUT [service host]/tasks_front/v1/:id.xml

PARAMETER

| PARAMETER | REQUIRED | MEANING | EXAMPLE |
|---|---|---|---|
| status | REQUIRED | ONLY RECEIVED IS VALID | RECEIVED |
| delete_now | | SHOULD TASK INFORMATION BE DELETED NOW? | TRUE/FALSE |

FIG.16B

RESPONSE

| ELEMENT | APPEARANCE NUMBER | MEANING |
|---|---|---|
| task | 1 | TOP NODE |
| task/location | 1 | LOCATION OF REGISTERED TASK |
| task/status | 1 | STATUS OF PROCESSING TASK (RECEIVED) |
| task/output-file-location | 0 OR 1 | LOCATION OF OUTPUT FILE |
| task/task-type | 1 | SERVICE NAME OF TASK PROCESSING |
| task/created-at | 1 | TASK REGISTRATION TIME |
| task/updated-at | 1 | TASK INFORMATION UPDATE TIME |
| task/message | 0 OR 1 | ERROR MESSAGE |

EXAMPLE

```
<task>
 <location>https://XXX.compute-1.AAA.com/tasks_front/tasks/:id.xml</location>
 <status>received</status>
 <output-file-location>https://XXX.compute-1.AAA.com/storage/BB/4/entries/file/62
 </output-file-location>
 <task-type>Simple_OCR_Japanese_v1</task-type>
 <created-at type="datetime">2009-04-21T06:24:44Z</created-at>
 <updated-at type="datetime">2009-04-21T06:24:52Z</updated-at>
 <expired-at type="datetime">2009-04-21T06:24:52Z</expired-at>
</task>
```

FIG.21

| ORDER PLACEMENT NUMBER | ORDER RECEIPT DATE | ORDER PLACEMENT DATE | PRODUCT ID | CLIENT ID | IMAGE |
|---|---|---|---|---|---|
| 000001 | H22.3.10 | H22.3.10 | xxxxxx | X1 | IMAGE 1 |
| 000002 | H22.3.12 | H22.3.12 | xxxxxy | X2 | IMAGE 2 |
| 000004 | H22.3.12 | H22.3.12 | zzzzzz | Y2 | IMAGE 3 |
| 000005 | H22.3.15 | H22.3.15 | xxyxxy | Z1 | IMAGE 4 |
| ... | ... | ... | ... | ... | ... |

IMAGE PROCESSING SYSTEM, IMAGE PROCESSING APPARATUS, IMAGE FORMING APPARATUS, IMAGE PROCESSING METHOD, PROGRAM, AND RECORDING MEDIUM WITH LOGIN MANAGEMENT AND AUTHENTICATION TICKETS

BACKGROUND OF THE INVENTION

1. Field of the Invention

The present invention relates to an image processing system for processing image data. Also, the present invention relates to an image processing apparatus, an image forming apparatus, an image forming method, a program, and a recording medium used for the image processing system.

2. Description of the Related Art

In recent years and continuing to the present, it has become common practice for many companies to connect image input/output devices such as multi-function complex machines to a network. Image input/output devices have an important role in improving the efficiency of operations. Particularly, distribution management systems that efficiently digitize and distribute paper documents have become important. The distribution management system is roughly divided into an image input device (e.g., a scanner) and a distribution management server. In the distribution management server, plural distribution processing menus corresponding to various operations and purposes are registered in advance. A user selects a processing menu suitable for an operation from the operations panel (operations unit) of a scanner to perform scanning.

For example, Patent Document 1 discloses a technology for performing the distribution processing of image data using a workflow. Specifically, the distribution processing and image conversion processing are made into plug-ins. A user or a manager arbitrarily combines the plug-ins with each other to generate the workflow for performing input, image conversion, and output, and performs the distribution processing of image data by using the generated workflow. Further, an image forming apparatus, which incorporates the function of the distribution management server for performing distribution management, cannot process some applications due to the processing load of a CPU and the limitation of a memory capacity.

On the other hand, known technologies provide the service of an ASP (Application Service Provider) using a sophisticated office machine as an interface. For example, Patent Document 2 discloses a technology for processing a function that an image forming apparatus itself cannot process. Specifically, in such a case, the image forming apparatus transmits electronic information to a service provider to perform a desired service, and then acquires a result of a service from the service provider.

However, it is unusual for the service provider to perform processing without limitation. Therefore, the service provider may have the mechanism of assigning a processing right to a predetermined device. Here, it is assumed that the service provider provides the device having succeeded in login with an authentication ticket. However, this is effective only for communications between a user who uses a service and the service provider, and a high processing load occurs if user authentication is performed for every internal communication on the side of the service provider. In addition, if the service provider performs data communications without any checks in the internal communications, there arise problems in security.

Patent Document 1: JP-A-2006-018640
Patent Document 2: JP-A-2002-252732

SUMMARY OF THE INVENTION

Accordingly, the present invention has been made in light of the above problems and may have a first object of providing an image processing system that reduces a processing load on the side of a service provider to perform communications. Also, the present invention may have the first object of providing an image processing apparatus, an image forming apparatus, an image processing method, a program and a recording medium used for the image processing system. Moreover, the present invention may have a second object of providing an image processing system that reduces a processing load in consideration of security on the side of a service provider to perform communications. Also, the present invention may have the second object of providing an image processing apparatus, an image forming apparatus, and image processing method, a program, and a recording medium used for the image processing system.

According to an aspect of the present invention, there is provided an image processing system that connects an image forming apparatus to a service providing system via a network to perform image processing. The image processing system includes a user management unit that manages login from the image forming apparatus and issues an authentication ticket to the image forming apparatus; a task request unit that makes an image processing request including image data to the service providing system with an addition of the authentication ticket; a detection unit that detects whether the image processing request is authorized; a task processing unit that makes, after receiving the authorized image processing request, the image processing request with an addition of user information accompanied by identification information indicating an internal communication from the service providing system, the user information being acquired by querying the user management unit; a task management unit that stores, after confirming the internal communication based on the identification information, a task indicating the image processing request acquired from the task processing unit in a task queue; one or more image processing units that acquire a processible image processing request indicated by the task stored in the task queue to perform the image processing, the task management unit capable of receiving an inquiry about the task from the one or more image processing units; a storage unit that stores the image data processed by the one or more image processing units; and an acquisition unit that specifies a location where the processed image data are stored and acquires the image data.

According to another aspect of the present invention, there is provided an image processing apparatus that manages an image processing request from an image forming apparatus connected via a network. The image processing apparatus includes a user management unit that manages login from the image forming apparatus and issues an authentication ticket to the image forming apparatus; a task processing unit that acquires, after receiving the image processing request including the authorized authentication ticket, user information by querying the user management unit and makes the image processing request with an addition of the user information; and a task management unit that stores a task indicating the image processing request acquired from the task processing unit in a task queue and receives an inquiry in relation to the task from one or more image processing units.

According to still another aspect of the present invention, there is provided an image forming apparatus that distributes acquired image data in accordance with a workflow in which one or more processing steps are defined. The image forming apparatus includes a login unit that makes a request for logging into a processing server that controls a service providing system for performing image processing; a ticket acquisition unit that acquires an authentication ticket from the processing server; a request unit that makes an image processing request to the service providing system with an addition of the authentication ticket; an image acquisition unit that acquires image data subjected to the image processing by the service providing system; and a distribution unit that distributes the acquired image data in accordance with the workflow.

Other objects, features and advantages of the present invention will become more apparent from the following detailed description when read in conjunction with the accompanying drawings.

BRIEF DESCRIPTION OF THE DRAWINGS

FIG. 8 is a diagram showing an example of various tables managed by the user management;

FIGS. 10A and 10B are sequence diagrams showing an example of image processing using the image processing service according to the first embodiment;

FIGS. 11A and 11B are diagrams showing an example of a request and a response when a plug-in acquires an authentication ticket from the user management;

FIGS. 12A and 12B are diagrams showing an example of a request and a response when the plug-in uploads a file to a storage;

FIGS. 13A and 13B are diagrams showing an example of a request and a response when the plug-in registers a task in a task master;

FIGS. 14A and 14B are diagrams showing an example of a request and a response when the plug-in acquires the status of the task from a task front;

FIG. 15 is a diagram showing an example of a request when the plug-in acquires an output file from the storage;

FIGS. 16A and 16B are diagrams showing an example of a request and a response when the plug-in reports the completion of acquiring a processed file to the task front;

FIG. 21 is a diagram showing an example of management data related to order placement.

DETAILED DESCRIPTION OF THE PREFERRED EMBODIMENTS

Next, referring to the accompanying drawings, a description is specifically made of an image processing system, an image forming apparatus, an image processing apparatus (or an image processing server), an image processing method, a program, and a recording medium according to embodiments of the present invention.

Further, in the following embodiments, examples of an image input apparatus through which image data are input include a complex machine having a printer function, a scanner function, a copy function, and a facsimile function mounted in a single housing. The image input apparatus is not limited to the complex machine, but may be applied to any of a scanner, a facsimile machine, a copier, etc., so long as it is capable of receiving image data.

First Embodiment (System Configuration and Hardware Configuration)

Figure 1:
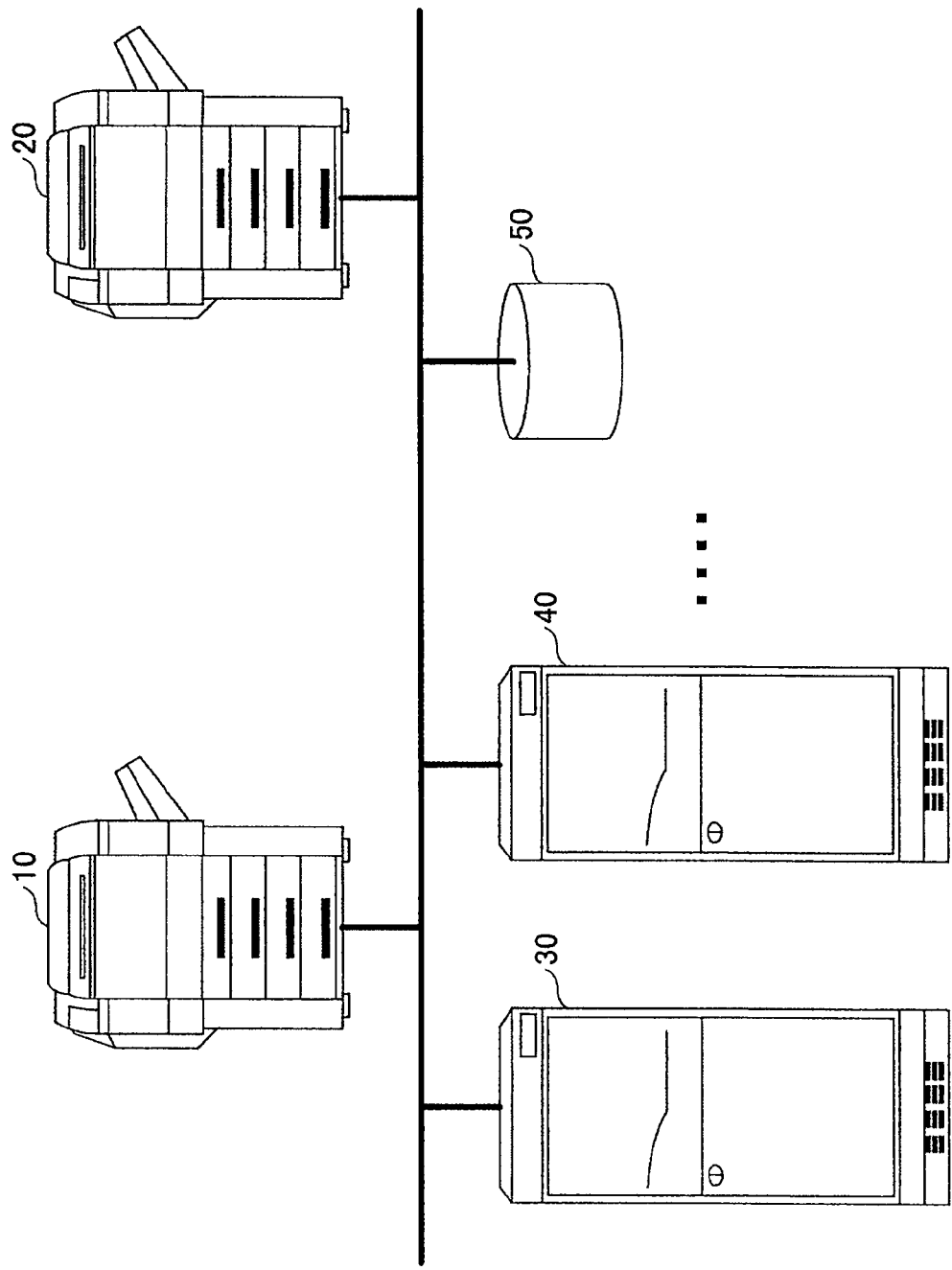
FIG. 1 is a diagram showing an example of an image processing system according to a first embodiment.

FIG. 1 is a diagram showing an example of the image processing system according to a first embodiment. As shown in FIG. 1, the image processing system has a MFP (Multifunction Peripheral) 10, a MFP 20, an image processing apparatus (image processing server) 30, an image management server 40, and a DB (Database) 50, all of which are connected to one another via a network. Hereinafter, the image forming apparatus is described using the MFP as an example.

The MFPs 10 and 20 have a scan function, a copy function, a print function, a facsimile function, etc., mounted in a single housing. The MFPs 10 and 20 scan a paper medium, etc., with the scan function to generate image data and transmits the generated image data to the image processing server 30. The MFPs are described in detail below. Further, the image data contain image data of documents.

Further, the MFPs 10 and 20 are computers such as workstations that receive scanned image data and perform various image processing and distribution processing in accordance with a specified workflow. The workflow refers to a series of processing flows in which one or more processing steps are defined. Examples of the workflow include e-mail transmission, FAX transmission, folder transmission, etc.

Further, the MFPs 10 and 20 execute the workflow based on input image data, and accumulate or distribute documents in accordance with the workflow constructed by a user.

The image processing server 30 manages functions that are not included in the respective MFPs, and manages image processing requests from the respective MFPs. Note that the image processing server may be provided for each function, which is described in detail below.

The image management server 40 accumulates and manages image data distributed from the respective MFPs. In addition, the image management server 40 can register and search for image types corresponding to accumulated image data.

The DB 50 stores image data transmitted from the respective MFPs and image data processed by the image processing apparatus. Note that the number of the image processing apparatuses connected to the image processing system may be more than one.

Figure 2:
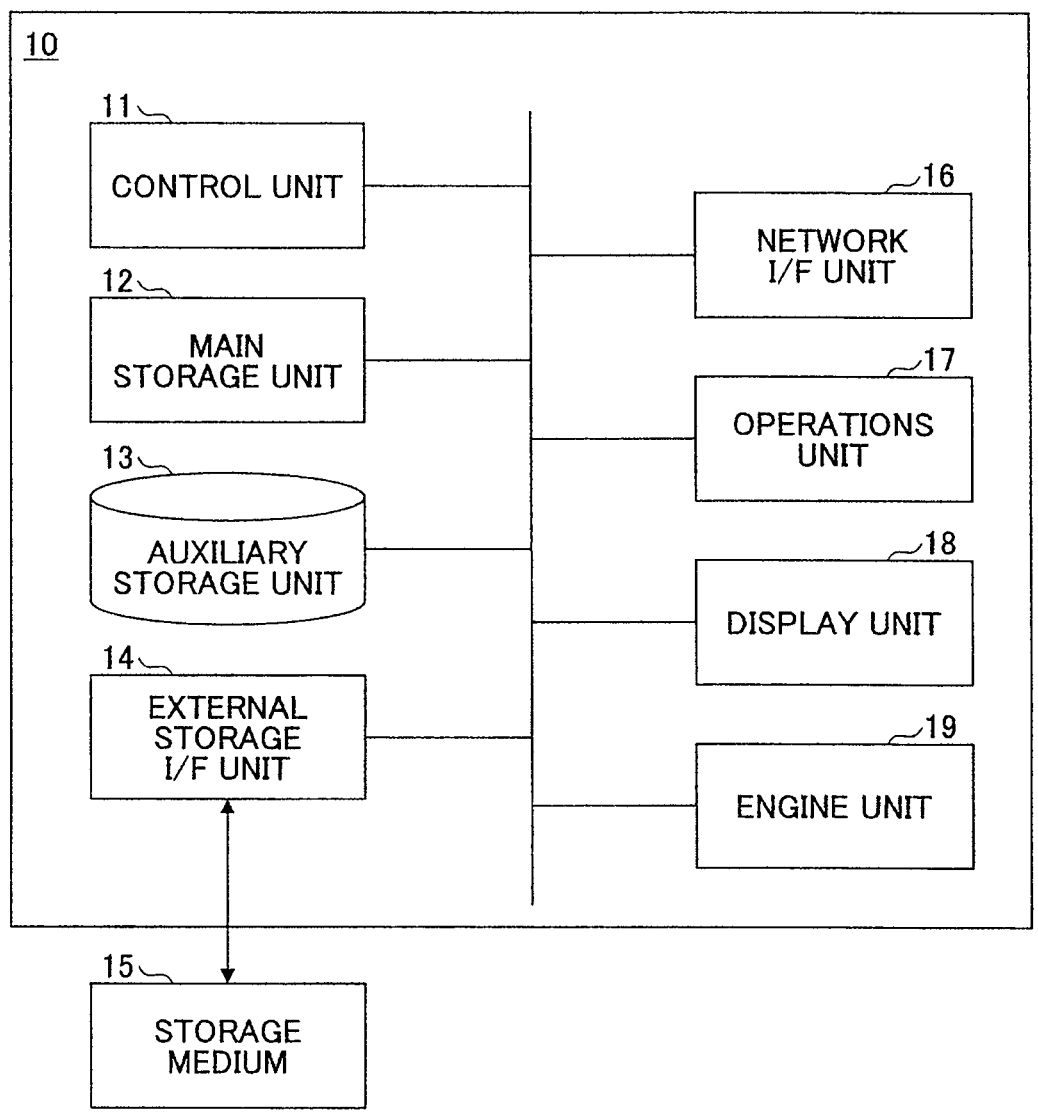
FIG. 2 is a block diagram showing an example of the hardware configuration of a MFP according to the first embodiment.

Hardware configurations of the MFP 10 and the image processing server 30 according to the first embodiment are described. FIG. 2 is a block diagram showing an example of the hardware configuration of the MFP 10 according to the first embodiment.

As shown in FIG. 2, the MFP 10 has a control unit 11, a main storage unit 12, an auxiliary storage unit 13, an external storage I/F unit 14, a network I/F unit 16, an operations unit 17, a display unit 18, and an engine unit 19.

The control unit 11 is a CPU that controls each unit and calculates and processes data in the computer. In addition, the control unit 11 is a calculation unit that performs a program stored in the main storage unit 12. That is, the control unit 11 calculates and processes data received from the input unit and the storage unit, and then outputs the data to the output unit and the storage unit.

The main storage unit 12 is a ROM (Read Only Memory), a RAM (Random Access Memory), or the like, which stores or temporarily stores the program and data of an OS as basic software performed by the control unit 11, application software, etc.

The auxiliary storage unit 13 is a HDD (Hard Disk Drive), or the like, which stores data associated with application software.

The external storage I/F unit 14 is an interface between the MFP 10 and a storage medium 15 (such as a flash memory) connected via a data transmission path such as a USB (Universal Serial Bus).

Further, the storage medium 15 stores a predetermined program. The program stored in the storage medium 15 is installed in the MFP 10 via the external storage I/F unit 14. The installed predetermined program is capable of being performed by the MFP 10.

The network I/F unit 16 is an interface between the MFP 10 and a peripheral device having a communication function connected via a network such as a LAN (Local Area Network) and a WAN (Wide Area Network) constructed by a data transmission path including, e.g., a wire and/or a wireless line. The operations unit 17 and the display unit 18 are display and/or input units that are composed of a key switch (hard key) and a LCD (Liquid Crystal Display) having a touch panel function (including the software key of a graphical user interface), and serve as UIs (user interfaces) for using the functions of the MFP 10.

The engine unit 19 is a mechanism part such as a plotter or a scanner that actually performs processing related to image formation.

Figure 3:
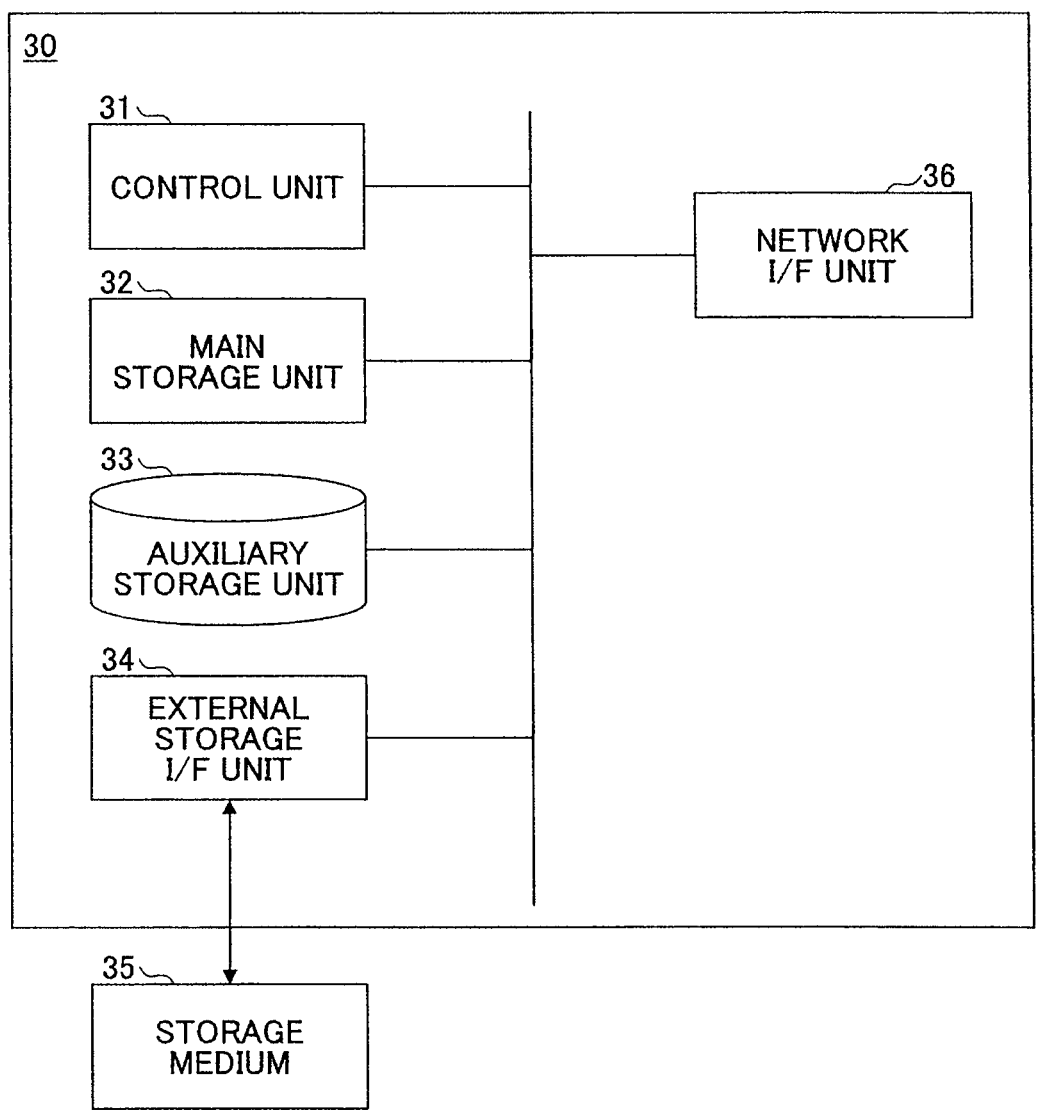
FIG. 3 is a block diagram showing an example of the hardware configuration of an image processing server according to the first embodiment.

FIG. 3 is a block diagram showing an example of the hardware configuration of the image processing server 30 according to the first embodiment. As shown in FIG. 3, the image processing server 30 has a control unit 31, a main storage unit 32, an auxiliary storage unit 33, an external storage I/F unit 34, and a network I/F unit 36.

The control unit 31 is a CPU that controls each unit and calculates and processes data in the computer. In addition, the control unit 31 is a calculation unit that performs a program stored in the main storage unit 32. That is, the control unit 31 calculates and processes data received from the input unit and the storage unit, and then outputs the data to the output unit and the storage unit.

The main storage unit 32 is a ROM (Read Only Memory), a RAM (Random Access Memory), or the like, which stores or temporarily stores the program and data of an OS as basic software executed by the control unit 31, application software, etc.

The auxiliary storage unit 33 is a HDD (Hard Disk Drive), or the like, which stores data associated with application software.

The external storage I/F unit 34 is an interface between the image processing server 30 and the storage medium 15 (such as a flash memory) connected via a data transmission path such as a USB (Universal Serial Bus).

Further, the storage medium 15 stores a predetermined program. The program stored in the storage medium 15 is installed in the image processing server 30 via the external storage I/F unit 34. The installed predetermined program is capable of being performed by the image processing server 10.

The network I/F unit 36 is an interface between the image processing server 30 and a peripheral device having a communication function connected via a network such as a LAN (Local Area Network) and a WAN (Wide Area Network) constructed by a data transmission path including, e.g., a wire and/or a wireless line.

(Function Configuration)

Figure 4:
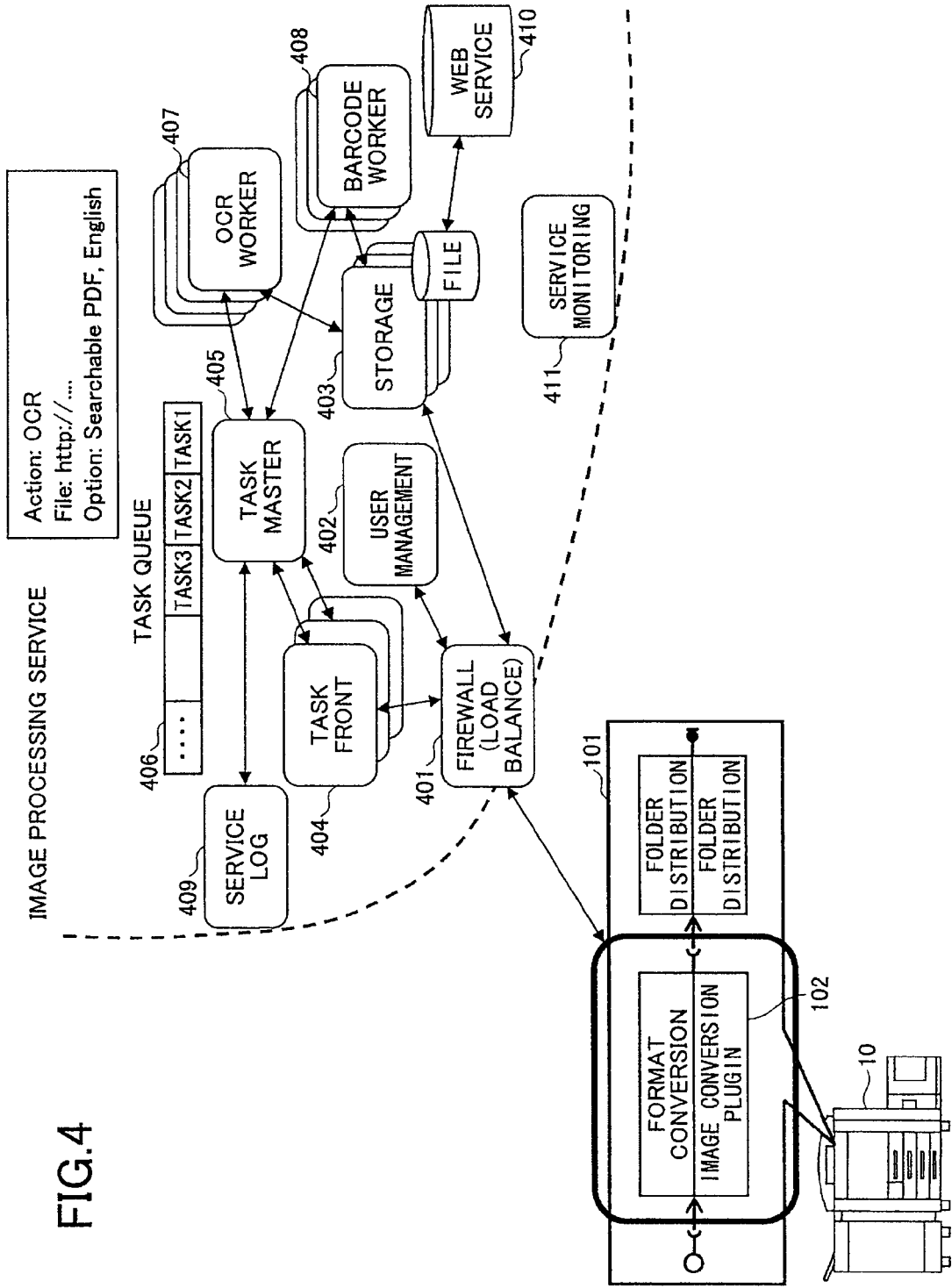
FIG. 4 is a block diagram showing an example of the function configuration of the image processing system according to the first embodiment.

FIG. 4 is a block diagram showing an example of the function configuration of the image processing system according to the first embodiment. In the example shown in FIG. 4, the MFP 10 distributes an acquired image (e.g., scanned image) in accordance with the workflow 101. At this time, it is assumed that the MFP 10 does not have an image conversion function included in the workflow. Accordingly, an image conversion plug-in 102 (task request unit, acquisition unit) requests a service providing system (hereinafter referred also to as an image processing service) to perform image processing (e.g., OCR (optical character recognition)). In the following description, the image conversion plug-in 102 is just called a plug-in 102.

Further, the plug-in 102 of the MFP 10 acquires an authentication ticket from a user management 402 before accessing the image processing service. With the addition of the acquired authentication ticket, the plug-in 102 requests the image processing service to perform image processing.

As shown in FIG. 4, the image processing service has the functions of a firewall 401, the user management 402, a storage 403, a task front 404, a task master 405, a task queue 406, an OCR worker 407, a barcode worker 408, a service log 409, a web service 410, and a service monitoring 411.

The firewall (detection unit) 401 serves not only as a firewall that detects unauthorized access but also as a load balancer that distributes a load. The load balancer has the function of collectively managing requests from an external network and transferring the requests to plural servers having an equivalent function.

The user management (user management unit) 402 is an application that provides a function allowing a user to perform single sign-on with respect to the task front 404, the storage 403, and the service log 409.

The storage 403 is a storage unit that can be commonly used by various applications. The storage 403 serves as a web application that temporarily stores a pre-processing file and a processed file during the image processing service. Further, the plug-in 102 of the MFP 10 uploads a pre-processing file to the storage 403 and downloads a processed file from the storage 403. Further, such files are image data.

The task front (task processing unit) 404 is a web application that receives a file and task information from the plug-in 102 of the MFP 10 and returns information on the result of processing a task to the plug-in 102.

The task master (task management unit) 405 is a web application that receives a processing task such as OCR from the task front 404 and other applications. In addition, the task master 405 manages the task queue 406 and the task workers (such as the OCR worker 407 and the barcode worker 408).

The task queue 406 stores a processing task requested by the plug-in 102 in a (FIFO) first-in and first-out manner.

The OCR worker 407 is a service program that receives a task from the task master and processes the task of OCR.

The barcode worker 408 is a service program that receives a task from the task master 405 and processes the task of barcode reading. Note that the task from the task master 405 may include plural processing. For example, the task may perform the processing of the barcode worker 408 after the processing of the OCR 407.

Further, a task worker (image processing unit) higher in level than the OCR worker 407 and the barcode worker 408 is a service program that receives a task from the task master 405 and performs various image processing. The number of server instances where the task worker operates increases and decreases depending on the task queue 406 managed by the task master 405.

The service log 409 is a web application that collectively stores the logs of various applications. In the image processing service, the log of an OCR task, e.g., can be viewed.

The web service 410 is provided on the Internet and has the function of accessing with an XML-based protocol. Examples of the web service 410 include translation processing. Note that according to the first embodiment, the translation processing of the web service 410 may be performed after the OCR processing of the OCR worker 407. The service monitoring 411 monitors the service and resource of each server.

Further, the plug-in 102 of the MFP 10 uploads a file (e.g., image data) to the image processing service with an HTTPS communication and receives a processing result. Note that a communication inside the image processing service is called an internal communication, and a communication between the MFP 10 and the devices and applications inside the image processing service is called an external communication.

Figure 5:
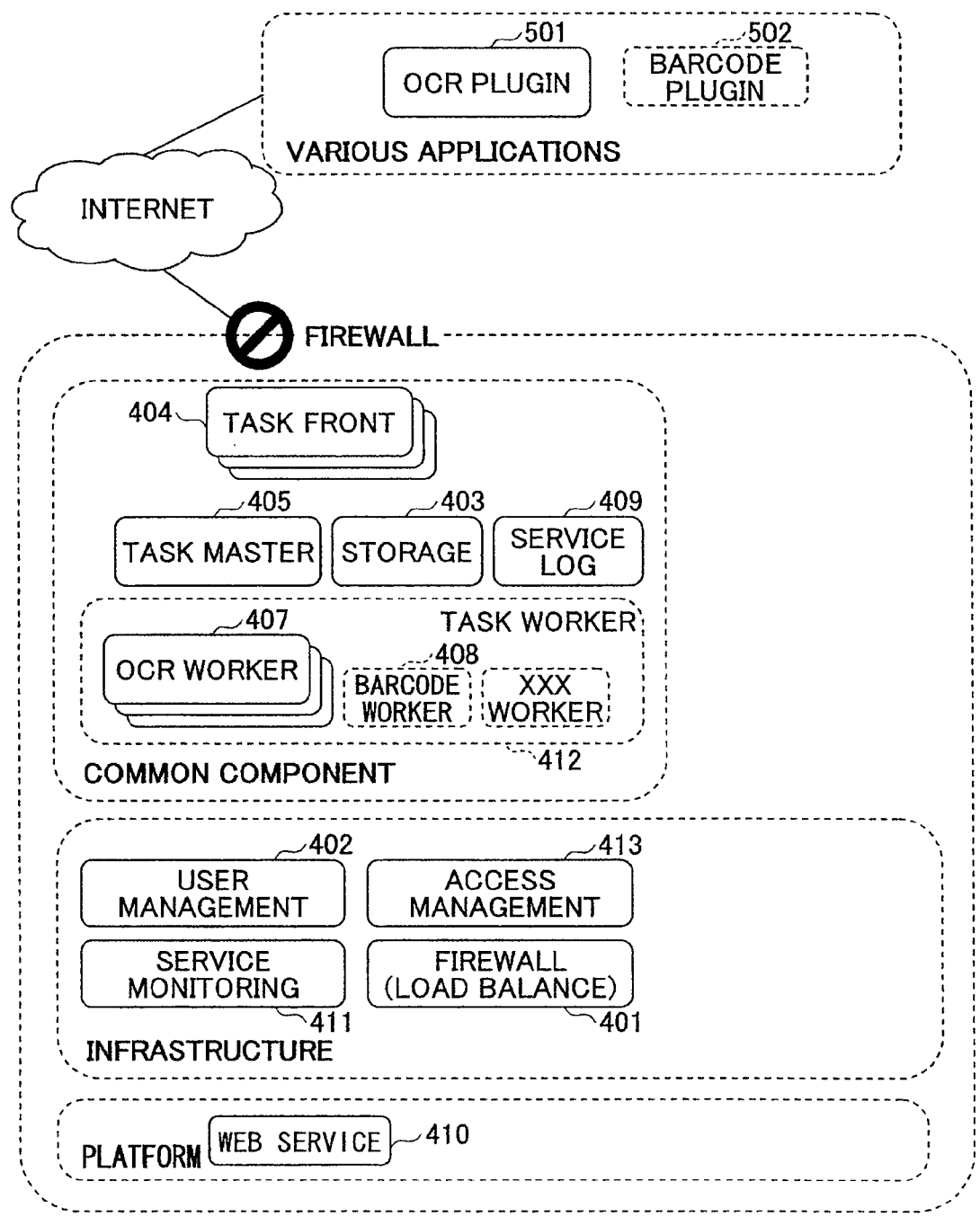
FIG. 5 is a block diagram showing an example of another function configuration of the image processing system according to the first embodiment.

FIG. 5 is a block diagram showing an example of another function configuration of the image processing system according to the first embodiment. In the example shown in FIG. 5, the image processing service receives image processing requests from an OCR plug-in 501 and a barcode plug-in 502 that the MFP 10 cannot process.

In the example shown in FIG. 5, the image processing system includes the task front 404, the task master 405, the storage 403, the service log 409, and the task worker 412 as a common component group. The common component group can be commonly used in document solution. The common component group is constructed by a flexible web API so as to deal with a MFP, which does not have an image distribution function, and types of image processing. Further, the storage 403 and the service log 409 can be used for applications other than image processing. Further, the common component group is constructed so as to easily achieve scale-out in accordance with a processing amount.

In addition, in the example shown in FIG. 5, the image processing system includes the firewall 401, the user management 402, the service monitoring 411, and an access management 413 as an infrastructure group. The infrastructure group implements the functions of the image processing service, and protects and manages security.

The access management 413 manages which and to what extent a contract account can use an application. In cooperation with the user management 402, the access management 413 provides a mechanism that allows the web application of the firewall to easily confirm the limitation of using an application.

Moreover, in the example shown in FIG. 5, the image processing system includes the web service 410 as a platform. The platform provides the platform of the web service 410.

Note that in the configuration described above, the task front 404 and the task master 405 are separated from each other. Therefore, it is possible to distribute access from the MFP 10 and that from the task worker 412. In addition, since the task front 404 can be expanded, it is possible to deal with an increase in the number of MFPs and accessing applications.

(Outline of Image Processing Service)

Figure 6:
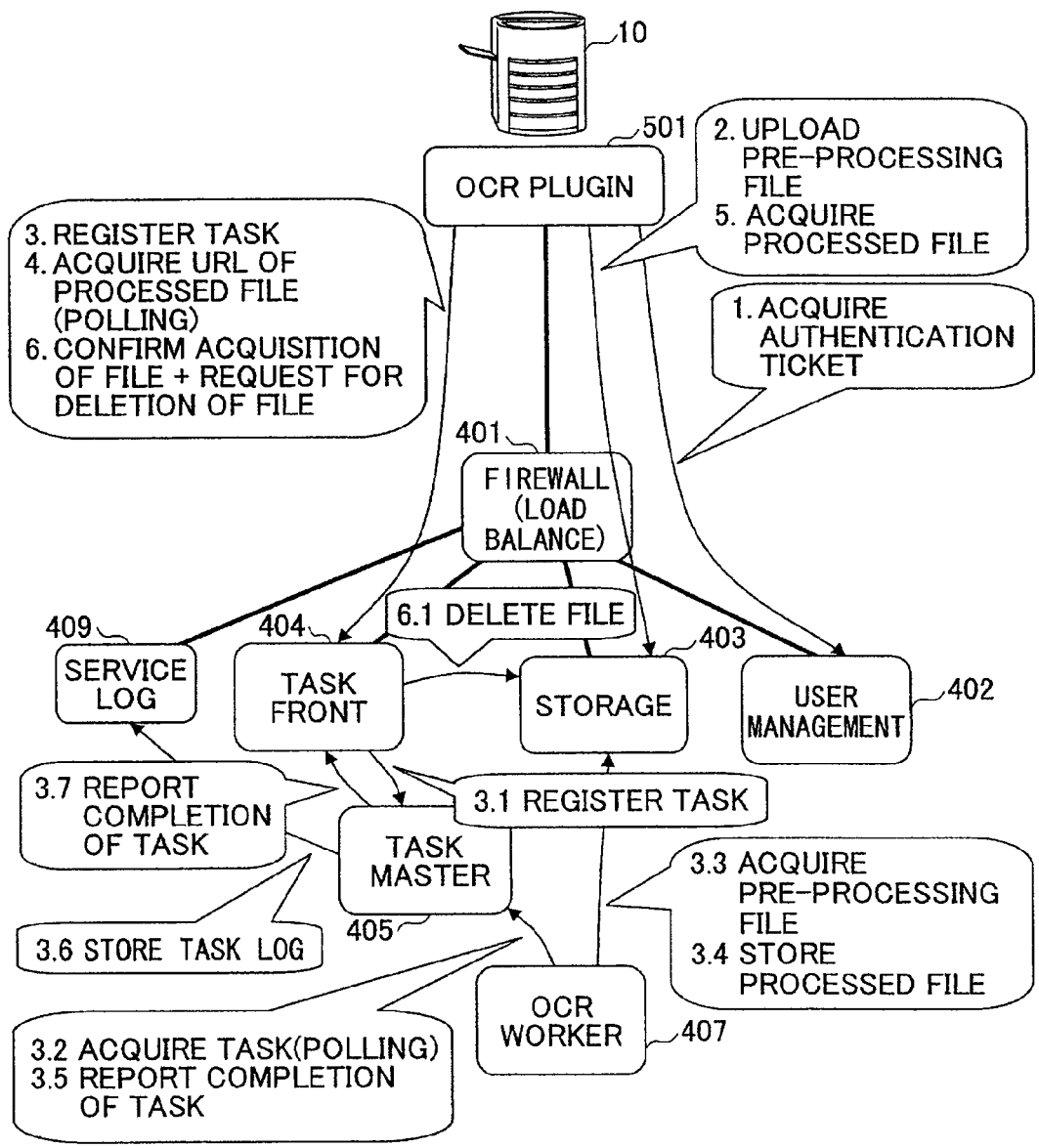
FIG. 6 is a diagram showing the outline of an example of a service provided by an image processing service according to the first embodiment.

FIG. 6 is a diagram showing the outline of an example of a service provided by the image processing service according to the first embodiment. First, the OCR plug-in 501 of the MFP 10 attempts to acquire an authentication ticket from the user management 402 (1).

If the acquisition of the authentication ticket is successful, the OCR plug-in 501 uploads a file (image data), which has not been subjected to OCR processing, to the storage 403 (2) with the authentication ticket added to the header of an HTTPS request. Note that the file may be uploaded via the task front 404.

Further, the OCR plug-in 501 makes an OCR processing request (task) including information indicating the location of the storage 403 where the file is stored to the task front 404 (3). Next, on the side of the image processing service, the task front 404 reports the task of the OCR processing request to the task master 405 and registers the task in the task queue 406 (3.1).

The OCR worker 407 inquires of the task master 405 (polling) about if there is any task capable of being processed by the OCR worker 407 itself, and acquires the corresponding task if any (3.2). The OCR worker 407 acquires the information on the location of the file from the task and acquires the file that has not been subjected to OCR processing from the storage 403 (3.3).

The OCR worker 407 applies OCR processing to the acquired file and stores the processed file in the storage 403 (3.4). At this time, the OCR worker 407 stores the information on the location of the storage 403 where the processed file is stored. The OCR worker 407 reports the completion of the task to the task master 405 together with the information on the location of the processed file (3.5).

Upon receipt of the report on the completion of the task from the OCR worker 407, the task master 405 stores information that the task has been successfully completed as a log in the service log 409 (3.6).

After the completion of storing the task log in the service log 409, the task master 405 reports the completion of the task to the task front 404 (3.7).

The OCR plug-in 501 inquires of the task front 404 (polling) about if OCR processing has been completed, and acquires the URL (information on the location) of the processed file (4).

The OCR plug-in 501 accesses the storage 403 with the authentication ticket added to the HTTPS request, and acquires the processed file stored in the location indicated by the information on the location (5).

After the confirmation of acquiring the file, the OCR plug-in 501 accesses the task front 404 with the authentication ticket added to the HTTPS request and requests for deleting the task (6).

As described above, the MFP 10 requests the image processing service to perform the processing (e.g., OCR processing) that the MFP 10 itself cannot perform due to the limitations of its CPU and memory, and thus can acquire the file (image data) that has been subjected to OCR processing. At this time, a user does not intervene the processing on the side of the image processing service.

(Outline of User Management and Authentication Processing)

Figure 7:
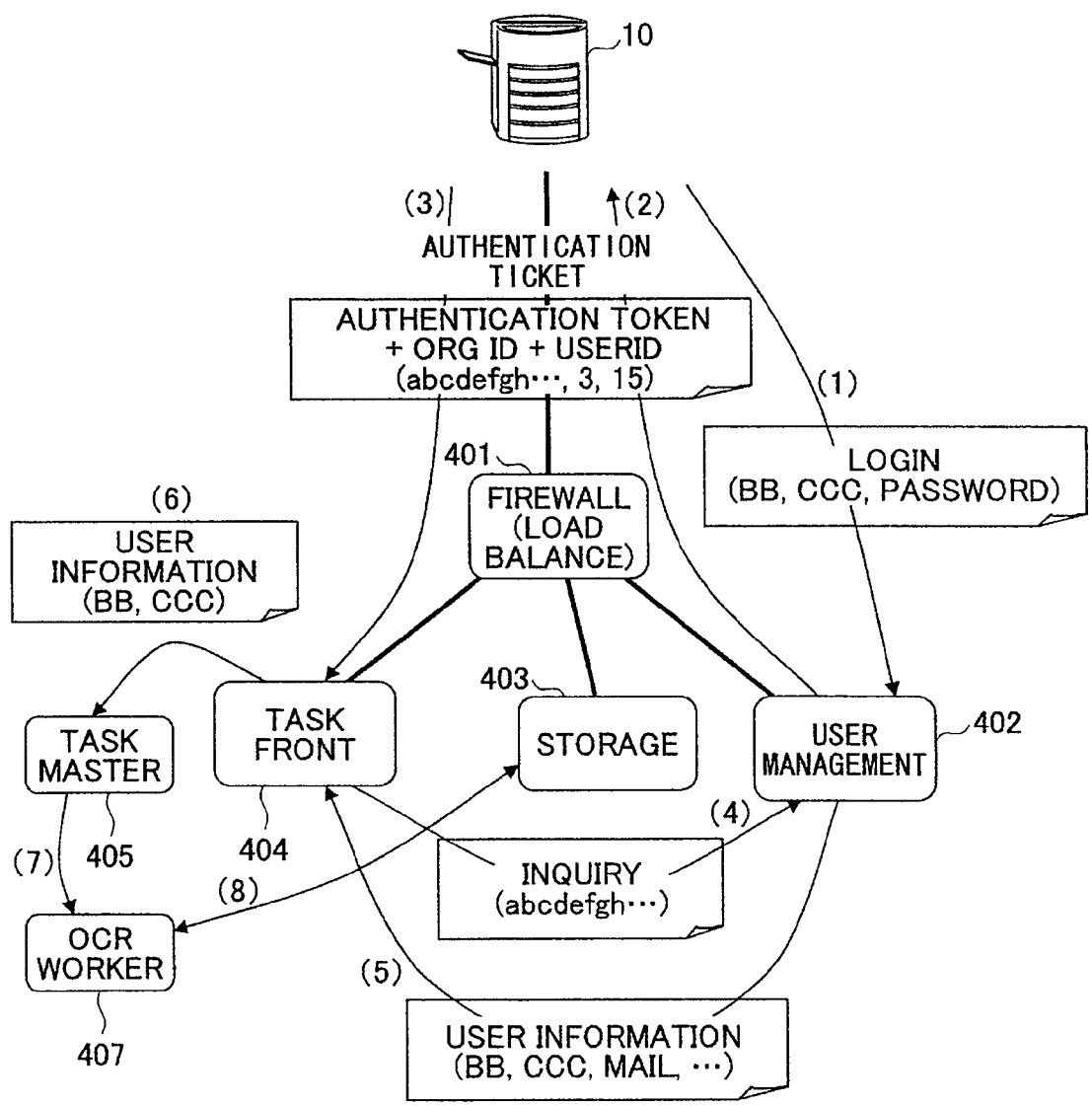
FIG. 7 is a diagram showing the outline of an example of user management and authentication processing according to the first embodiment.

FIG. 7 is a diagram showing the outline of an example of user management and authentication processing according to the first embodiment. First, the MFP 10 logs into the user management 402 (1). Login information includes organization information "BB," user name information "CCC," and a password.

FIG. 8 is a diagram showing an example of various tables managed by the user management 402. As shown in FIG. 8, the user management 402 manages an organization table, a user table, a license table, a service table, and a session table.

The organization table stores an organization ID, an organization name, and an address so as to be associated with one another. The user table stores a user ID, the organization ID, a login name, and a password so as to be associated with one another. The license table stores a license ID, the user ID, a service ID, and a state so as to be associated with one another.

Further, the service table stores the service ID and a service name so as to be associated with each other. The session table stores a session ID and the user ID so as to be associated with each other.

The user management 402 transmits an authentication ticket including the authentication token (session ID), the organization ID, and the user ID to the MFP 10 that have logged into the user management 402 (2).

At this time, the user management 402 calculates a hash by adding the user ID and the organization ID, and uses the calculated hash as the session ID. Further, the user management 402 uses a secret key to calculate the hash, thereby making it possible to prevent the hash from being tampered. Here, the user management 402 calculates the hash from the user ID "15" and the organization ID "3," and uses "abcdefgh" as the authentication token. Here, as shown in FIG. 8, the user management 402 stores the calculated session ID and the user ID in the session table.

When requesting the image processing service to perform image processing, the plug-in 102 of the MFP 10 accesses the task front 404 with the addition of the HTTPS request accompanied by the authentication ticket (3).

At this time, the MFP 10 uses the authentication token to (externally) communicate with the image processing service. Further, an application that needs only uniqueness uses an ID to reduce the number of inquiries to the user management 402 (e.g., only a creator has a viewing right).

Further, the authentication ticket is encrypted by HTTPS, while the firewall 401 confirms whether the authentication ticket is authorized by calculating the hash. Accordingly, if the organization ID is changed, tampering of the authentication ticket can be detected. That is, the firewall 401 can detect access by an unauthorized authentication ticket.

Next, the task front 404 inquires of the user management 402 about user information by using the authentication ticket (4). At this time, the task front 404 may inquire of the license table shown in FIG. 8 about the usage state of the service.

Further, the authentication ticket includes the organization ID and the user ID. Therefore, it is not necessary for the task front 404 to inquire of the user management 402 if the task front 404 does not need any other information.

When receiving the inquiry about the user information from the task front 404, the user management 402 outputs the user information including an organization name and a user name to the task front 404 (5).

Upon receipt of the user information from the user management 402, the task front 404 adds the user information itself including the organization name and the user name to the header of the HTTP request in the (internal) communication from the image processing service. Moreover, the task front 404 adds the application name of the task front 404 itself to the header for clarifying the internal communication. The task front 404 adds the user information itself and the identification information of the task front 404 itself (e.g., application name or identification information of a unit that performs the application) to the header and requests the task master 405 to register the task (6).

Thus, since the user information itself is exchanged, it is not necessary for the task front 404 to inquire of the user management 402 every internal communication. Further, since the task front 404 adds the identification information of the task front 404 itself to the header in consideration of security, an application that receives the request can determine whether it is the internal communication by confirming the identification information added to the header. At this time, the application inside the image processing service maintains the identification information of each application inside the image processing service.

Next, the OCR worker 407 performs the same communication as that performed in (6) and acquires the task from the task master 405 (7).

The OCR worker 407 acquires a file from the storage 403 under the right of the acquired organization name "BB" and the user name "CCC," and writes the processed file in the storage 403 (8). Note that the OCR worker 407 communicates with the storage 403 in the same manner as that performed in (6).

Thus, the (external) communication between the MFP 10 and the image processing service can be safely performed using the authentication ticket. Further, as to the (internal) communication inside the image processing service, the task front 404 adds raw the user information to the HTTP extension header, thereby making it possible to reduce the number of inquiries to the user management 402. Moreover, the task front 404 adds the identification information of an application to the HTTP extension header, thereby making it possible to confirm the internal communication and ensure security.

(Configuration Example of Image Processing Service)

Figure 9:
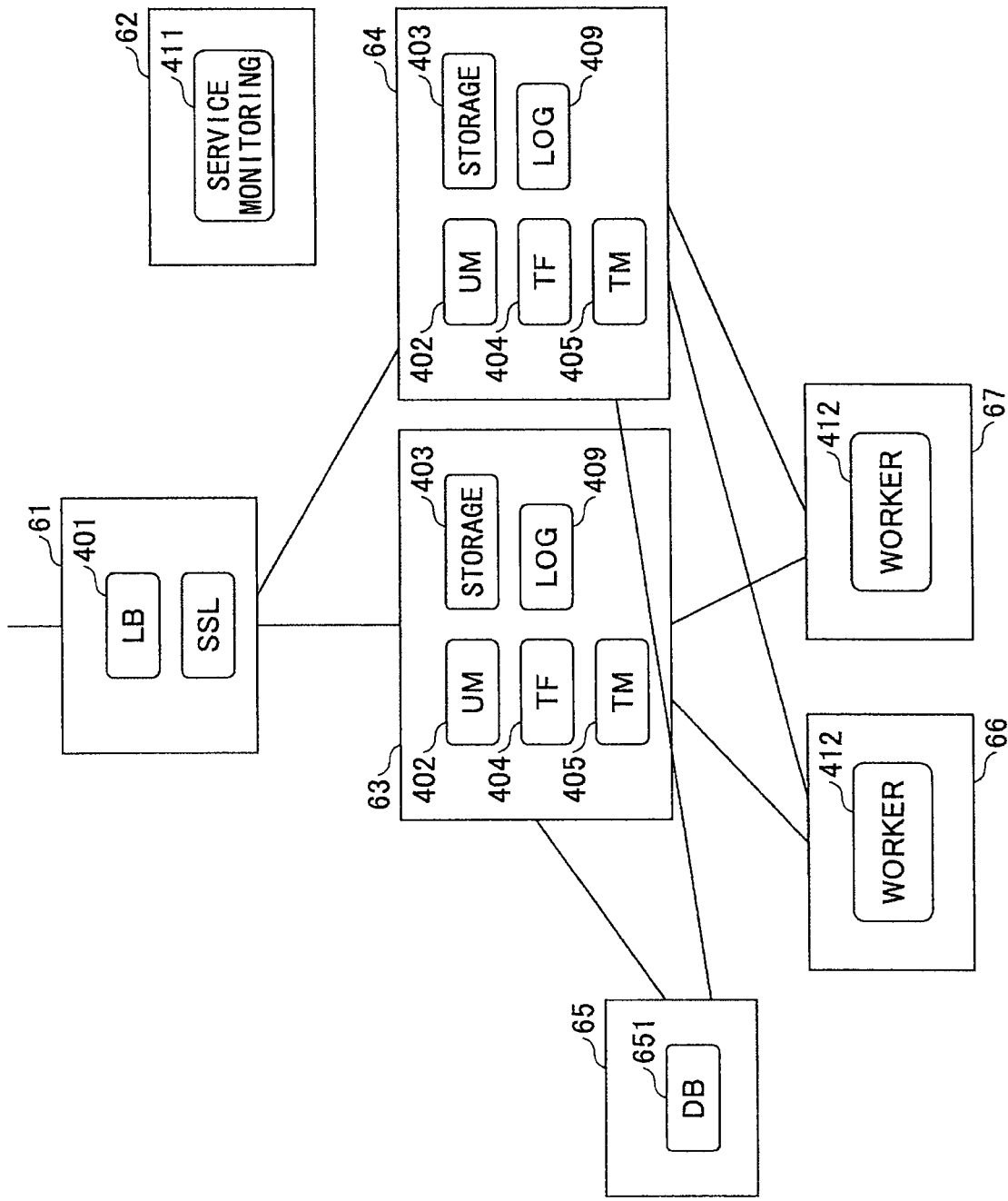
FIG. 9 is a diagram showing an example of equipment configuring the image processing service.

FIG. 9 is a diagram showing an example of equipment configuring the image processing service. In the example shown in FIG. 9, the image processing service is configured by an information processing apparatus having the load balancer 401 and a SSL communication function; an information processing apparatus 62 having the function of the service monitoring 411; information processing apparatuses 63 and 64 having the functions of the user management 402, the storage 403, the task front 404, the task master 405, and the service log 409; a DB server 65 having the DB 651; and information processing apparatuses 66 and 67 having the task worker 412.

The DB 651 manages the tables of the user management 402, the storage 403, the task front 404, the task master 405, and the service log 409. Further, the DB 651 is a DB that functions at the back-end of each web application.

Note that the configuration of the image processing service is not limited to the example shown in FIG. 9. For example, either one of the information processing apparatuses 63 and 64 may be used, or the number of the information processing apparatuses may be three or more. Further, the number of the DB servers 65 may be two or more.

(Operations)

Figure 10A:
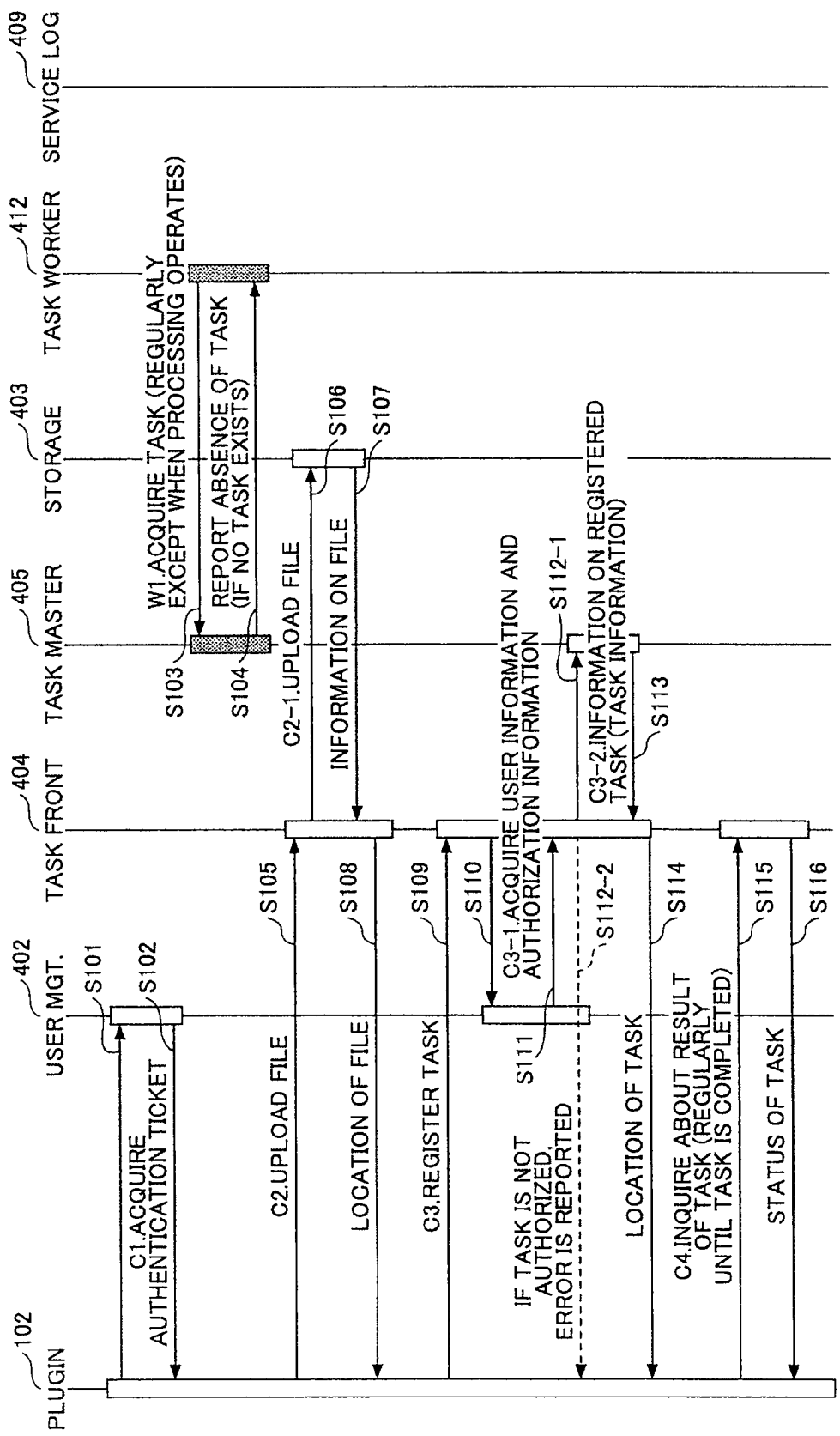

Next, operations of the image processing system according to the first embodiment are described. FIGS. 10A and 10B are sequence diagrams showing an example of the image processing using the image processing service according to the first embodiment. In step S101 shown in FIG. 10A, the plug-in 102 requests the user management 402 to provide an authentication ticket.

Note that a communication between the plug-in 102 and the image processing service is performed over HTTPS. Accordingly, before making other HTTPS requests, the plug-in 102 requests the user management 402 to provide the authentication ticket. The plug-in 102 always adds the authentication ticket to the header of a cookie included in the request. The cookie is a protocol for managing a status between a web server and a web browser over HTTPS, which also indicates information stored in the web browser involved. Note that as described above, the communication inside the image processing service does not use the authentication ticket but uses user information itself and, e.g., an application name.

In step S102, the plug-in 102 acquires the authentication ticket from the user management 402.

Here, FIGS. 11A and 11B are diagrams showing an example of the request and the response when the plug-in 102 acquires the authentication ticket from the user management 402. FIG. 11A shows an example when the plug-in 102 requests the user management 402 to provide the authentication ticket. As shown in FIG. 11A, parameters of the request include an organization name, a login name, and a password. FIG. 11B shows an example of the response when the plug-in 102 acquires the authentication ticket from the user management 402. As shown in FIG. 11B, if the plug-in 102 successfully acquires the authentication ticket from the user management 402, "service_tkt" is set to the cookie.

Referring back to FIG. 10A, in step S103, the task worker 412 regularly attempts to acquire a task from the task master 405 except when the processing of the task worker 412 itself operates. If there is no task in the task master 405 in step S104, the task master 405 reports this result to the task worker 412.

In step S105, the plug-in 102 outputs a file to be processed to the task front 404 and requests the task front 404 to upload the file. In step S106, the task front 404 uploads the file to the storage 403.

In step S107, the task front 404 acquires information on the uploaded file. The information on the uploaded file includes information (on the location) of the file. In step S108, the task front 404 reports the location of the file to the plug-in 102.

Here, FIGS. 12A and 12B are diagrams showing an example of the request and the response when the plug-in 102 uploads the file to the storage 403. FIG. 12A shows an example of the request when the plug-in 102 uploads the file to the storage 403. As shown in FIG. 12A, parameters of the request include a file content, the number of files to be transmitted, and information specifying the job of a client.

FIG. 12B shows an example when the plug-in 102 uploads the file to the storage 403. As shown in FIG. 12B, the location of the uploaded file is included in the response.

Note that the location of the file obtained from the response when the plug-in 102 uploads the file to the storage 403 is specified at a task registration time described below. In case that many files are to be uploaded, it is possible to upload the files many times at a single task registration.

The task front 404 may put access limitations on uploading the file to the storage 403 as follows:

1) Uploading the file with the account of a noncontract company is not permitted;

2) Accessing the uploaded file is permitted only with an account used when the file is uploaded; and 3) Accessing an expired file is not permitted.

Referring back to FIG. 10A, in step S109, the plug-in 102 requests the task front 404 to register the task of image processing.

In step S110, the task front 404 requests the user management 402 to provide user information and authorization information (i.e., information on whether the task is authorized). In step S111, the user management 402 outputs the user information and the authorization information corresponding to the request to the task front 404.

In step S112-1, if the task front 404 acquires from the user management 402 information indicating that the user information and the task are authorized, the task front 404 registers the task in the task master 405. On the other hand, in step S112-2, if the task front 404 acquires from the user management 402 information indicating that the task is not authorized, the task front 404 reports an error to the plug-in 102.

In step S113, the task master 405 outputs information on the registered task (task information) to the task front 404.

In step S114, the task front 404 reports the location of the task included in the task information to the plug-in 102.

Here, FIGS. 13A and 13B are diagrams showing an example of the request and the response when the plug-in 102 registers the task in the task master 405. FIG. 13A shows an example of the request when the plug-in 102 registers the task in the task master 405. As shown in FIG. 13A, parameters of the request include the location of an uploaded file, the service name of image processing, and the setting values of image processing. In addition, as information items for logging, the parameters may include a user name and a job ID at login, and an application name and a version in the image processing of a client.

FIG. 13B shows an example of the response when the plug-in 102 registers the task in the task master 405. As shown in FIG. 13B, the response includes the location of the registered task, the processing status of the task, the service name of processing the task, and a task registration time. In addition, in case that an error is caused at the registration of the task, the response includes an error type and an error message.

Note that at the registration of the task, the task front 404 transmits the location of a file, an option (e.g., a setting value) for performing image processing, and information necessary for a log to the task master 405.

The task front 404 may put access limitations on registering the task in the task master 405 as follows:

1) Registration of the task with the account of a noncontract company is not permitted;

2) Registration of only a service capable of being used with a contract account is permitted (within the limitation of using a file); and 3) Registration of the task is not permitted if the URL of an input file does not specify the storage of a corresponding company.

Referring back to FIG. 10A, in step S115, the plug-in 102 regularly inquires of the task front 404 (polling) about the status of the task until the task is completed. In step S116, the plug-in 102 acquires the status of the task from the task front 404.

FIGS. 14A and 14B are diagrams showing an example of the request and the response when the plug-in 102 acquires the status of the task from the task front 404. FIG. 14A shows an example of the request when the plug-in 102 acquires the status of the task from the task front 404. As shown in FIG. 14A, the plug-in 102 requests the task front 404 to provide the processing status of the task.

FIG. 14B shows an example of the response when the plug-in 102 acquires the status of the task. As shown in FIG. 14B, the response includes the location of the registered task, the processing statuses of the task ("being processed," "successfully completed," and "processing error"), the location of an output file, the service name of processing the task, a task registration time, and a task information update time. In the example shown in FIG. 14B, the respective responses correspond to the processing statuses of the task "being processed," "successfully completed," and "processing error."

The plug-in 102 regularly queries the task front 404 (polling) about the status of the registered task and waits for the completion of processing the task. When the processing of the task is completed, the location of an output file is included in the response.

The task front 404 may put access limitations when the plug-in 102 acquires the status of the task from the task front 404 as follows:

1) Accessing with an account that is not registered is not permitted; and

2) Accessing an expired task is not permitted.

Referring back to FIG. 10B, in step S117, the task worker requests the task master 405 to provide the task. In step S118, the task master 405 outputs information on the task to the task worker 412.

In step S119, the task worker 412 requests the storage 403 to provide a file based on the location of the file included in the information on the task. In step S120, the task worker 412 acquires the file to be processed from the indicated location of the storage 403. In step S121, the task worker 412 regularly reports the status of task being processed to the task master 405 during image processing.

In step S122, the plug-in 102 queries the task front 404 (polling) about the status of the task. In step S123, the plug-in 102 acquires the status of the task from the task front 404.

In step S124, when the image processing of the file is completed, the task worker 412 uploads the processed file to the storage 403. In step S125, the task worker 412 acquires the location of the processed file from the storage 403.

In step S126, the task worker 412 reports a processing result of the task to the task master 405. In step S127, the task master 405 reports the processing result of the task to the task front 404. In step S128, the task front 404 reports the completion of successfully registering the result to the task master 405.

In step S129, the task master 405 stores the completion of the task in the service log 409. In steps S130 and S131, the service log 409 acquires a file-use limitation number from the user management 402 if it is the first day of a month.

In step S132, if the number of files to be used goes beyond the use limitation number, the service log 409 reports to the user management 402 that it will disapprove an authorized status. In step S133, after registering a log, the service log 409 reports the successful completion of registering the log to the task master 405.

In step S134, the task master 405 outputs a success/failure in registering the log or information on the next task to the task worker 412.

In step S135, the plug-in 102 inquires of the task front 404 about the status of the task. In step S136, the plug-in 102 acquires the status of the task from the task front 404. Here, the plug-in 102 acquires the result of processing the task as being "successfully completed."

In steps S137 and S138, the plug-in 102 acquires from the storage 403 the processed file at the location of the output file included in the result of processing the task.

FIG. 15 is a diagram showing an example of the request when the plug-in 102 acquires the output file from the storage 403. As shown in FIG. 15, the plug-in 102 requests the storage 403 to provide the processed file at the URL specified by the information on the task. In this case, the storage 403 provides the plug-in 102 with the processed file as a response.

Note that the storage 403 may put access limitations when the plug-in 102 acquires the output file from the storage 403 as follows:

1) Accessing the task with an account that is not registered is not permitted; and 2) Accessing an expired file is not permitted.

Referring back to FIG. 10B, in step S139, the plug-in 102 reports the completion of acquiring the processed file to the task front 404. In step S140, the task front 404 reports the acquisition of the processed file by the plug-in 102 to the task master 405.

In step S141, the task master 405 records an acquisition log in the service log 409. In step S142, the service log 409 reports the successful registration of the log to the task master 405.

In step S143, the task front 404 reenters the expiration of the processed file stored in the storage 403.

In step S144, the task master 405 reports the completion of the acquisition processing to the task front 404. In step S145, the task front 404 reports the completion of the acquisition processing to the plug-in 102.

FIGS. 16A and 16B are diagrams showing an example of the request and the response when the plug-in 102 reports the completion of acquiring the processed file to the task front 404. FIG. 16A shows an example of the request when the plug-in 102 reports the completion of acquiring the processed file to the task front 404. As shown in FIG. 16A, parameters of the request include a status and time when the file is deleted.

FIG. 16B shows an example of the response when the plug-in 102 reports the completion of acquiring the processed file to the task front 404. As shown in FIG. 16B, the response includes the location of a registered task, the processing status of the task (received status), the location of an output file, the service name of processing the task, a task registration name, a task information update time, etc.

Further, if reliably acquiring the processed file from the storage 403, the plug-in 102 reports the completion of acquiring the processed file to the task front 402. With this processing, the file and the information on the task can be deleted immediately. On the other hand, if the plug-in 102 does not report the completion of acquiring the processed file to the task front 402, the file and the information on the task are only required to be deleted after the elapse of a predetermined time.

Note that the task front 404 may put access limitations when the plug-in 102 reports the completion of acquiring the processed file to the task front 404 as follows:

1) Accessing with an account that is not registered is not permitted;
2) Accessing the task of which processing is not completed is not permitted; and
3) Accessing an expired task is not permitted.

As described above, according to the first embodiment, the service provider can perform communications in consideration of security and a processing load. Further, according to the first embodiment, even if processing A includes processing B that the MFP cannot process when the MFP performs the processing A, the service provider performs the processing B without the intervention of a user. The MFP can complete the processing A by acquiring data when the processing B is performed. In other words, the service provider can complete the processing performed by the MFP without the interruption of the processing (without the intervention of the user).

Second Embodiment

Next, the image processing service according to a second embodiment is described. According to the second embodiment, the service providing system has an accumulation management unit including a storage.

(Function Configuration)

Figure 17:
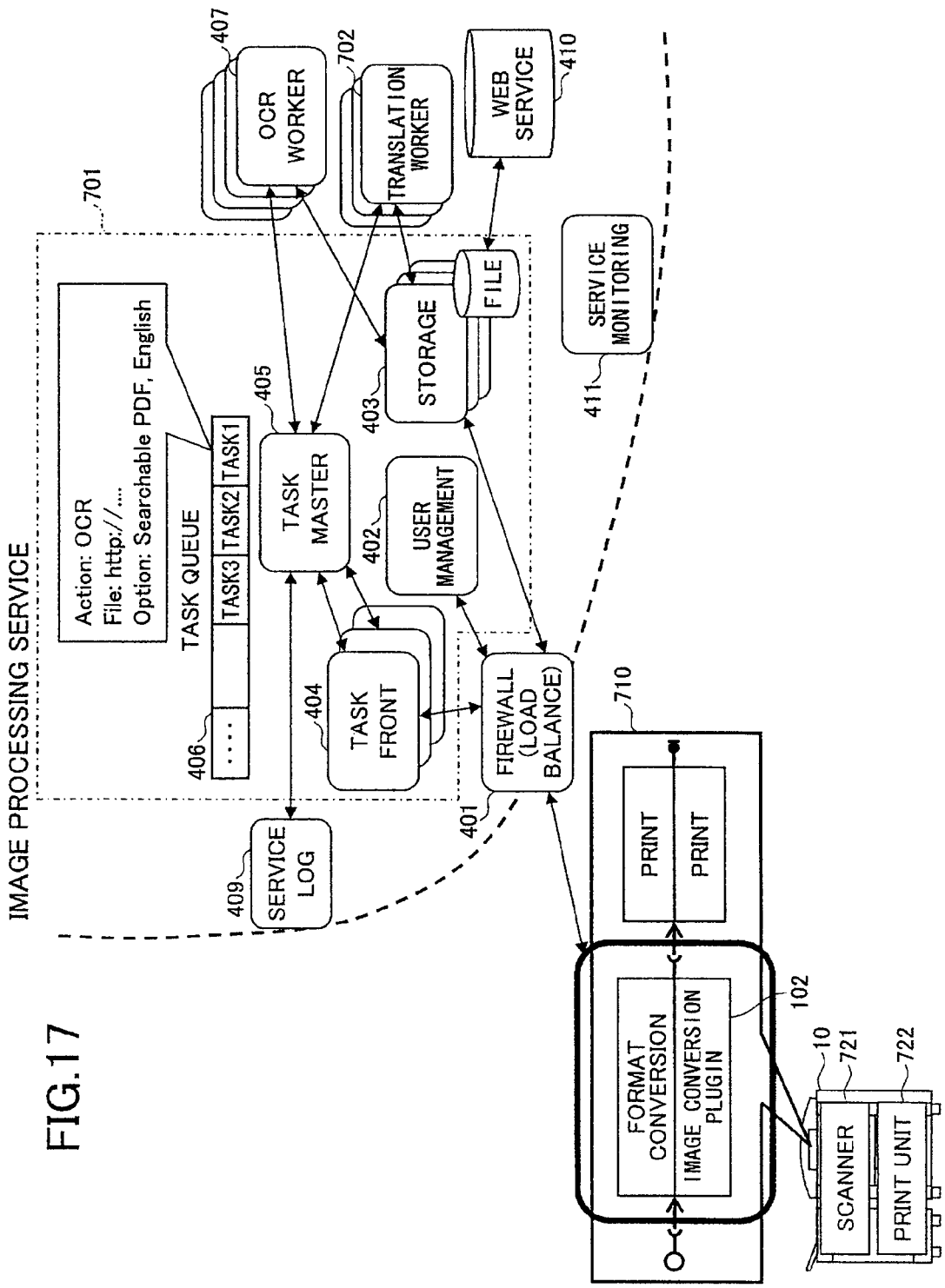
FIG. 17 is a block diagram showing an example of the function configuration of the image processing system according to a second embodiment.

FIG. 17 is a block diagram showing an example of the function configuration of the image processing system according to the second embodiment. As shown in FIG. 17, according to the second embodiment, the service providing system has the accumulation management unit 701. The accumulation management unit 701 has the user management 402, the storage 403, the task front 404, and the task master 405. The accumulation management unit 701 may have the OCR worker 407. The MFP 10 has a scanner 721 and a print unit 722.

In the example shown in FIG. 17, the MFP 10 distributes an acquired image (e.g., scanned image) in accordance with the workflow 701. In the workflow 710, image processing is, for example, performed to print an image. The image processing applies OCR processing to the scanned image so as to be converted, and then applies document processing (e.g., language conversion processing) to the converted document data. At this time, it is assumed that the MFP 10 does not have an image conversion function included in the workflow.

Figure 18:
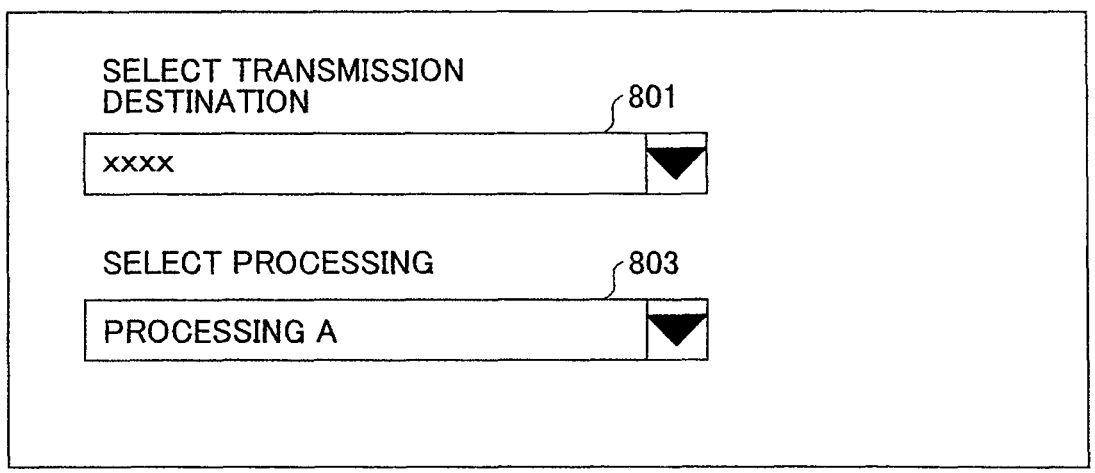
FIG. 18 is a diagram showing an example of a screen displayed by the MFP.

First, the MFP 10 causes an operations panel (e.g., operations unit 17 and display unit 18) to display a screen on which a user selects the transmission destination and the processing information of a scanned image. FIG. 18 is a diagram showing an example of the screen displayed by the MFP 10. In FIG. 18, a screen region 801 displays a selection box by which the user selects the transmission destination of the scanned image. A screen 803 displays a selection box by which the user selects the processing information (e.g., the workflow) of the scanned image. The user selects the desired transmission destination and the processing information of the scanned image from the screen regions 801 and 803. The screen shown in FIG. 18 is displayed after the user selects, e.g., the workflow 710. At this time, the user may select the converted language at the screen region 803 or another screen region. Further, it is assumed that the selected transmission destination is the accumulation management unit 701.

Referring back to FIG. 17, the scanned image transmitted from the MFP 10 is transmitted to the service providing system together with a processing request. The transmitted scanned image and the processing request are stored in the storage 403 of the accumulation management unit 701 via the firewall 401. With respect to the stored scanned image, the accumulation management unit 701 registers the tasks of OCR processing and language conversion processing included in the processing request in the task queue 406.

The OCR worker 407 queries the task master 405 about its processing, acquires the scanned image accumulated in the storage 403, and applies OCR processing to the scanned image so as to be converted into document data. The OCR worker 407 stores the processed document data in the storage 403. Note that the OCR worker 407 may be included in the accumulation management unit 701.

A translation worker 702 queries the task master 405 about its processing and acquires the processed document data from the storage 403. Then, the translation worker 702 applies language conversion processing to the document data and stores the data in the storage 403. At this time, the information on the location of the stored document data is reported to the task front 404 via the task master 405. Further, according to the second embodiment, the web service 410 may apply language conversion processing to the document data.

The task front 404 maintains the completion of the requested image processing. At this time, the task front 404 maintains the information on the location of the processed data so as to be associated with a report on the completion of the requested image processing.

Next, the MFP 10 queries of the service providing system (polling) about the completion of the processing. Specifically, an image processing plug-in 711 inquires of the task front 404 about the completion of the processing and acquires information (e.g., URL) on a location where the processed data are stored.

The image processing plug-in 711 acquires the processed data and outputs the data to a print plug-in. By performing the print plug-in, the MFP 10 causes a print unit 722 to print the processed data.

(Outline of Service)

Figure 19:
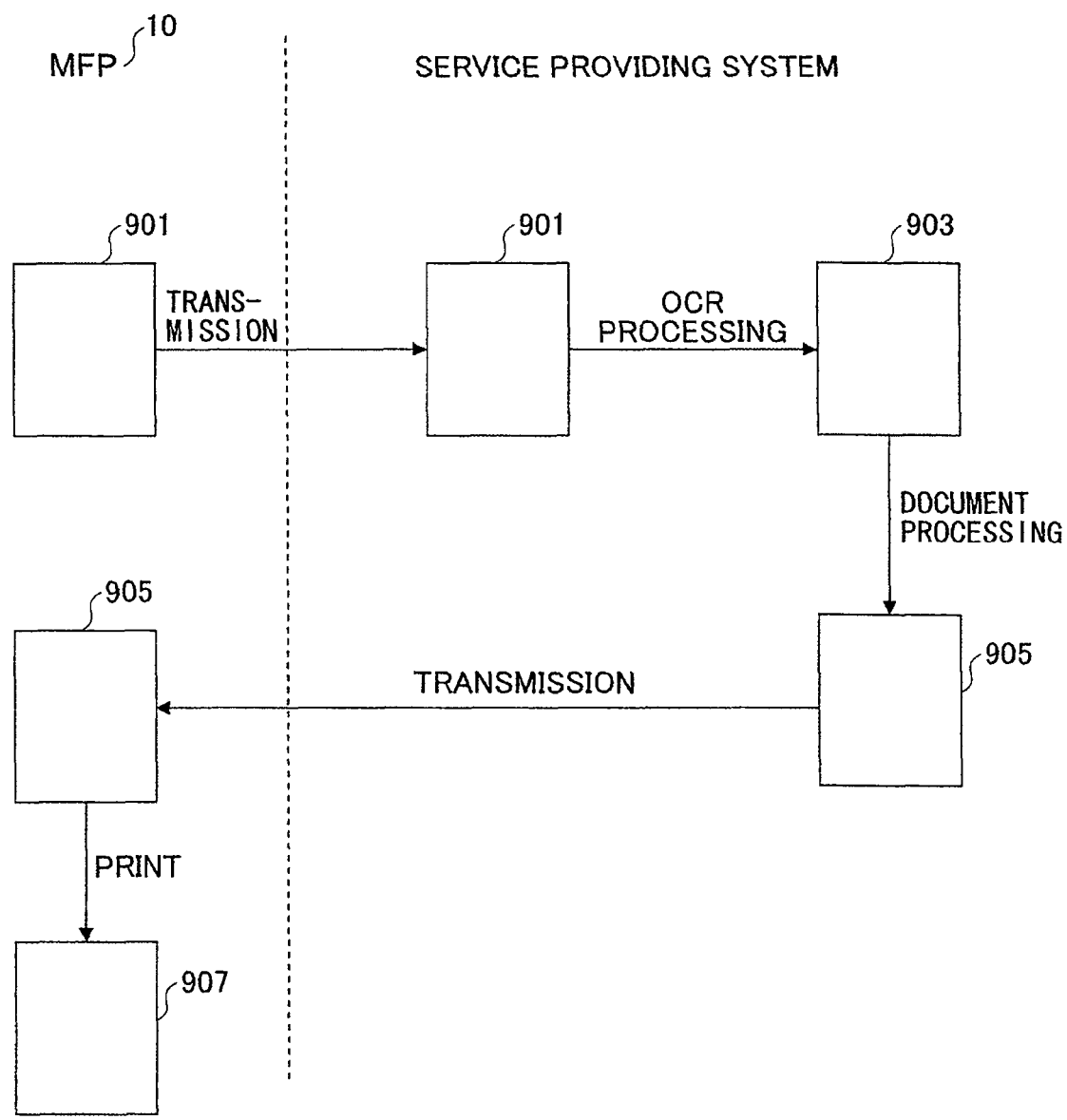
FIG. 19 is a diagram showing the outline of an example of a service according to the second embodiment.

FIG. 19 is a diagram showing the outline of an example of the service according to the second embodiment. In the example shown in FIG. 19, the MFP 10 first displays the transmission information and the processing information of the scanned image on the operations panel (see FIG. 18).

Here, it is assumed that the user selects the accumulation management unit 701 of the service providing system as the transmission destination and the workflow in which language conversion processing is performed after OCR processing as the processing information. Then, the user sets a document in the MFP 10 and presses an execution button for scanning.

When the execution button for scanning is pressed by the user, the scanner 721 scans the document and generates the scanned image 901. When the scanned image 901 is generated by the scanner 721, the MFP 10 transmits the scanned image 901 and the processing information to the service providing system through the network I/F unit 16 (communication unit).

The service providing system processes the acquired scanned image 901 in accordance with the processing information. Here, the service providing system applies OCR processing to the scanned image 901 to generate document data 903. In addition, the service providing system applies document processing (e.g., language conversion processing) to the document data 903. The language conversion processing performed by the service providing system includes, e.g., the conversion of Japanese document data into English document data. The language conversion processing can be performed using language conversion software or a language conversion application as a web service.

The converted document data 905 are acquired by the MFP 10 through the network I/F unit 16. The MFP 10 causes the print unit 722 to output print data 907 through the acquired document data 905.

Thus, the MFP 10 can cause the service providing system to perform the requested processing without the intervention of the user even if the MFP 10 itself cannot perform the requested processing. Further, the MFP 10 can automatically acquire data on which the requested image processing is performed from the service providing system and can automatically print the acquired data.

(Outline of Another Service)

Next, backup processing as one of the services according to the second embodiment is described. A MFP having poor resource capabilities (e.g., reduced capacity in a storage unit and less processing performance of a CPU) may be connected to the service providing system. In this case, since the MFP 10 cannot store large amounts of image data, the service providing system includes the service of having a backup of the image data in the storage unit of another apparatus.

For example, when the workflow of having the backup of the image data is selected, the MFP 10 causes the user to select the DB (Database) of a destination where the image data are backed up. The DB may be a web server. The MFP 10 scans a document with the scanner 721 and generates a scanned image. Then, the MFP 10 transmits the scanned image and the information on the destination where the image data are stored to the service providing system.

The service providing system transmits the scanned image acquired from the MFP 10 to the selected DB. The DB stores the received scanned image. The service providing system maintains the scanned image even after the scanned image is stored in the DB.

The MFP 10 regularly inquires of the service providing system (polling) about the completion of the processing. If the processing has been completed, the MFP 10 acquires the scanned image from the service providing system. The MFP 10 causes the print unit 722 to output print data through the acquired scanned image.

Thus, even the MFP having poor resource capabilities can have a backup of the scanned image with the service according to the second embodiment. Note that the above service can also be applied to MFPs other than that having a poor resource.

Modified Embodiment

Next, a modified embodiment of the image processing system is described. In the modified embodiment, the service providing systems according to the first embodiment and the second embodiment are directly or indirectly connected to a basic system. Here, the modified embodiment is described using the service providing system according to the second embodiment as an example. Among information systems of a company, the basic system handles sales, inventory management, finance, etc., directly linked to business affairs. The basic system is required to quickly process data because it handles large amounts of data.

(Function Configuration)

Figure 20:
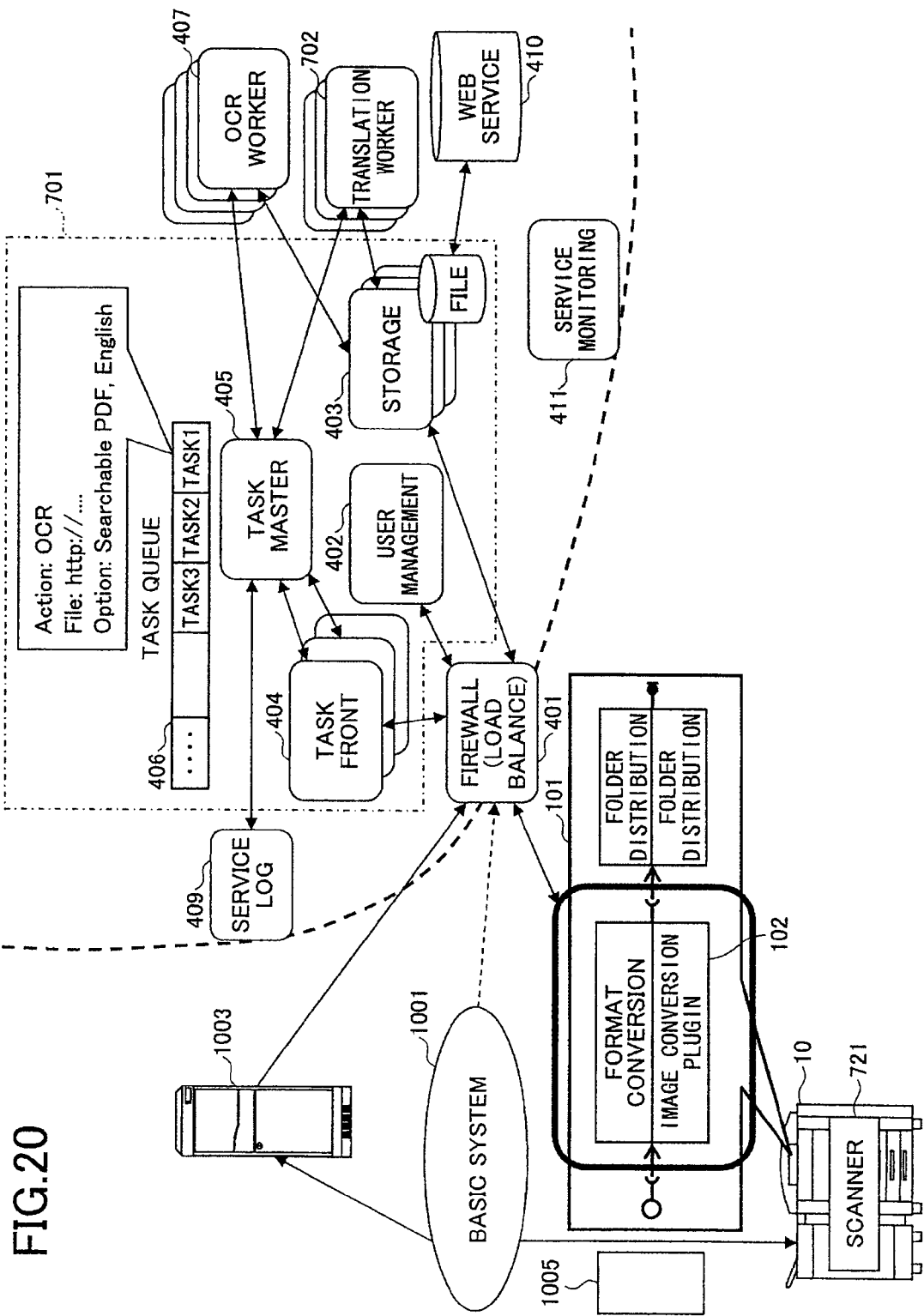
FIG. 20 is a block diagram showing an example of the function configuration of the image processing system according to a modified embodiment.

FIG. 20 is a block diagram showing an example of the function configuration of the image processing system according to the modified embodiment. As shown in FIG. 20, the image processing system has a basic system 1001, a server 1003, the MFP 10, and the service providing system. The modified embodiment describes an example of how to manage data when the basic system 1001 receives and places an order.

In FIG. 20, it is assumed that the basic system 1001 receives an order for a product. The basic system 1001 places the order for the product with an associated section. At this time, the basic system 1001 transmits order placement data accompanied by an ID (e.g., order placement number) to the server 1003. The order placement data contain, e.g., an order receipt date, an order placement date, a client ID, a product number, etc.

Upon receipt of the order placement data, the server 1003 transmits the order placement data to the service providing system. At this time, the server 1003 may transmit the order placement data in the form of a QR code for preventing data from being tampered.

Further, the basic system 1001 generates an order form 1005 based on the order placement data, and the order form 1005 is printed out by the associated section. The printed-out order form 1005 is scanned by the MFP 10 and transmitted to the service providing system based on the workflow 101. Further, the MFP 10 may transmit the scanned image of the order form to the service providing system via a distribution server.

The accumulation management unit 701 of the service providing system manages the order placement data acquired from the server 1003 and the scanned image of the order form acquired from the MFP 10 so as to be associated with each other. Specifically, the accumulation management unit 701 applies OCR processing to the scanned image of the order form to acquire an order placement number. The accumulation management unit 701 identifies the order placement number acquired from the scanned image with the order placement number added to the order placement data acquired from the server 1003.

If an identification result shows that the order placement number of the order placement data matches the order placement number of the scanned image, the accumulation management unit 701 stores and manages the order placement data and the scanned image so as to be associated with each other. The accumulation management unit 701 accumulates and manages the data of any one of the order placement data and the scanned image as error data. The accumulation management unit 701 can transmit the error data to a manager via e-mail.

FIG. 21 is a diagram showing an example of management data related to order placement. As shown in FIG. 21, the management data have order placement numbers as keys, order receipt dates, order placement dates, product IDs, client IDs, and images, all of which are associated with one another. Note that the order receipt dates, the order placement dates, the product IDs, and the client IDs are acquired from order placement data, and the images indicate scanned images. The scanned images may be image data of TIFF or PDF, or may be document data after being subjected to OCR processing.

Further, in case that the order placement data are converted into QR codes, the accumulation management unit 701 causes the barcode worker 408 to read the data of the QR codes, thereby acquiring the order placement number.

Thus, according to the modified embodiment, data output from the basic system 1001 can be easily and reliably managed with the connection of the service providing system to the basic system 1001.

Note that the image processing server of the embodiments has a hardware configuration that is provided with a control unit such as a CPU, a storage unit such as a ROM (Read Only Memory) and a RAM, and an external storage unit such as a HDD and a CD drive unit, and that uses a workstation and a general computer.

The program performed by the image processing server and the MFP of the embodiments is recorded in a computer-readable recording medium such as a CD-ROM, a FD (Flexible Disk), a CD-R, and a DVD (Digital Versatile Disk) as an installable or executable file, and then provided.

Further, the program performed by the image processing server and the MFP of the embodiments may be stored in a computer connected to a network such as the Internet, and may be downloaded via the network. Further, the program performed by the image processing server and the MFP of the embodiments may be provided or distributed via the network such as the Internet.

Further, the program performed by the image processing server and the MFP may be stored in the ROM, etc., in advance and then provided.

The program performed by the image processing server and the MFP of the embodiments has a module configuration including the units described above. As actual hardware, when the CPU (processor) reads the program from the recording medium and performs the read program, the respective units are loaded and generated on the main storage unit.

According to the embodiments of the present invention, it is also possible to provide an image processing method of an image processing system that connects an image forming apparatus to a service providing system via a network to perform image processing. The image processing method includes an issuance step of managing login from the image forming apparatus and issuing an authentication ticket to the image forming apparatus; a task request step of making an image processing request including image data to the service providing system with an addition of the authentication ticket; a detection step of detecting whether the image processing request is authorized; a task processing step of making, after receiving the authorized image processing request, the image processing request with an addition of user information accompanied by identification information indicating an internal communication from the service providing system, the user information being acquired by querying the user management unit; a storage step of storing, after confirming the internal communication based on the identification information, a task indicating the image processing request requested in the task processing step in a task queue; an image processing step of acquiring the processible image processing request indicated by the task stored in the task queue to perform the image processing; a storage step of storing the image data processed in the image processing step in a storage unit; and an acquisition step of specifying a location where the processed image data are stored and acquiring the image data.

According to the embodiments of the present invention, it is also possible to provide a recording medium having recorded therein a program that performs an image processing method of an image processing system that connects an image forming apparatus to a service providing system via a network to perform image processing. The image processing method includes an issuance step of managing login from the image forming apparatus and issuing an authentication ticket to the image forming apparatus; a task request step of making an image processing request including image data to the service providing system with an addition of the authentication ticket; a detection step of detecting whether the image processing request is authorized; a task processing step of making, after receiving the authorized image processing request, the image processing request with an addition of user information accompanied by identification information indicating an internal communication from the service providing system, the user information being acquired by querying the user management unit; a storage step of storing, after confirming the internal communication based on the identification information, a task indicating the image processing request requested in the task processing step in a task queue; an image processing step of acquiring the processible image processing request indicated by the task stored in the task queue to perform the image processing; a storage step of storing the image data processed in the image processing step in a storage unit; and an acquisition step of specifying a location where the processed image data are stored and acquiring the image data.

The present invention is not limited to the specifically disclosed embodiments, and variations and modifications may be made without departing from the scope of the present invention.

The present application is based on Japanese Priority Application Nos. 2009-179897 filed on Jul. 31, 2009, and 2010-072837 filed on Mar. 26, 2010, the entire contents of which are hereby incorporated herein by reference.

What is claimed is:

1. An image processing system that connects an image forming apparatus to a service providing system via a network to perform image processing, the image processing system comprising:
a user management unit that manages login from the image forming apparatus and issues an authentication ticket to the image forming apparatus;
a task request unit that makes an image processing request including image data to the service providing system with an addition of the authentication ticket;
a detection unit that detects whether the image processing request is authorized;
a task processing unit that makes, after receiving the authorized image processing request, the image processing request with an addition of user information accompanied by identification information indicating an internal communication from the service providing system, the user information being acquired by querying the user management unit;
a task management unit that stores, after confirming the internal communication based on the identification information, a task indicating the image processing request acquired from the task processing unit in a task queue;
one or more image processing units that acquire a processible image processing request indicated by the task stored in the task queue to perform the image processing, the task management unit capable of receiving an inquiry about the task from the one or more image processing units;
a storage unit that stores the image data processed by the one or more image processing units; and
an acquisition unit that specifies a location where the processed image data are stored and acquires the image data.

2. The image processing system according to claim 1, wherein
the user management unit adds a user ID and a session ID to the authentication ticket and adds a user name corresponding to the user ID to the user information if the session ID is correct in relation to the inquiry from the task processing unit.

3. The image processing system according to claim 2, wherein
the task processing unit makes the image processing request to the task management unit by using an HTTP request of which an extension header includes the user information and the identification information.

4. The image processing system according to claim 3, wherein
the image processing unit acquires the user information included in the HTTP request from the task management unit and stores the image data subjected to the image processing in the storage unit with an acquired user's right.

5. An image processing apparatus that manages an image processing request from an image forming apparatus connected via a network, the image processing apparatus comprising:
a user management unit that manages login from the image forming apparatus and issues an authentication ticket to the image forming apparatus;
a task processing unit that acquires, after receiving the image processing request including the authorized authentication ticket, user information by querying the user management unit and makes the image processing request with an addition of the user information; and
a task management unit that stores a task indicating the image processing request acquired from the task processing unit in a task queue and receives an inquiry in relation to the task from one or more image processing units.

6. The image processing apparatus according to claim 5, wherein
the user management unit adds a user ID and a session ID to the authentication ticket and adds a user name corresponding to the user ID to the user information if the session ID is correct in relation to the inquiry from the task processing unit.

7. The image processing apparatus according to claim 6, wherein
the task processing unit makes the image processing request to the task management unit by using an HTTP request of which an extension header includes the user information and identification information.

8. The image processing apparatus according to claim 7, wherein
the image processing unit acquires the user information included in the HTTP request from the task management unit and stores the image data subjected to the image processing in a storage unit with an acquired user's right.

9. An image forming apparatus that distributes acquired image data in accordance with a workflow in which one or more processing steps are defined, the image forming apparatus comprising:
a login unit that makes a request for logging into a processing server that controls a service providing system for performing image processing;
a ticket acquisition unit that acquires an authentication ticket from the processing server;
a request unit that makes an image processing request to the service providing system with an addition of the authentication ticket;
an image acquisition unit that acquires image data subjected to the image processing by the service providing system; and
a distribution unit that distributes the acquired image data in accordance with the workflow.

* * * * *